(12) United States Patent
Roberts et al.

(10) Patent No.: US 9,743,127 B2
(45) Date of Patent: Aug. 22, 2017

(54) MEDIA SERVICE USER INTERFACE SYSTEMS AND METHODS

(71) Applicant: Verizon Patent and Licensing Inc., Arlington, VA (US)

(72) Inventors: Brian F. Roberts, Dallas, TX (US); George M. Higa, Plano, TX (US); Anthony Lemus, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 73 days.

(21) Appl. No.: 14/675,581

(22) Filed: Mar. 31, 2015

(65) Prior Publication Data

US 2016/0127780 A1    May 5, 2016

Related U.S. Application Data

(60) Provisional application No. 62/072,863, filed on Oct. 30, 2014.

(51) Int. Cl.
*H04N 21/472* (2011.01)
*H04N 21/431* (2011.01)
(Continued)

(52) U.S. Cl.
CPC ....... *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01); *H04N 21/4725* (2013.01); *H04N 21/4755* (2013.01); *H04N 21/4788* (2013.01); *H04N 21/47202* (2013.01); *H04N 21/47205* (2013.01);
(Continued)

(58) Field of Classification Search
None
See application file for complete search history.

(56) References Cited

U.S. PATENT DOCUMENTS 9,398,350 B1 * 7/2016 Ong ..................... G06F 17/3082
2007/0157249 A1 * 7/2007 Cordray ................ G06F 3/0482
725/58

(Continued)

*Primary Examiner* — Pankaj Kumar
*Assistant Examiner* — Charles N Hicks

(57) ABSTRACT

An exemplary computer-implemented media service user interface system detects a request for information about a media program series and, in response, generates a media program series page for the media program series and provides a view of at least a portion of the media program series page for display on a display screen. In certain examples, the system generates the media program series page by determining, across multiple different media content presentation sources by way of which media content is accessible through a media service for presentation by a media content access device, episodes of the media program series that are available for access by the media content access device through the media service, and populating the media program series page with page content that represents the episodes of the media program series that are available for access by the media content access device through the media service.

18 Claims, 19 Drawing Sheets

(51) Int. Cl.
*H04N 21/45* (2011.01)
*H04N 21/466* (2011.01)
*H04N 21/442* (2011.01)
*H04N 21/462* (2011.01)
*H04N 21/4725* (2011.01)
*H04N 21/475* (2011.01)
*H04N 21/482* (2011.01)
*H04N 21/81* (2011.01)
*G06F 3/0482* (2013.01)
*H04N 21/4788* (2011.01)
*H04N 21/458* (2011.01)
*H04N 21/25* (2011.01)
*H04N 21/258* (2011.01)
*H04N 21/658* (2011.01)

(52) U.S. Cl.
CPC ..... *H04N 21/4821* (2013.01); *H04N 21/4825* (2013.01); *H04N 21/4826* (2013.01); *H04N 21/6582* (2013.01); *H04N 21/8133* (2013.01)

(56) References Cited

U.S. PATENT DOCUMENTS

| | | | |
|---|---|---|---|
| 2013/0035086 A1* | 2/2013 | Chardon | H04N 21/00 455/420 |
| 2015/0237391 A1* | 8/2015 | Tsuji | H04N 21/4316 725/43 |

* cited by examiner

MEDIA SERVICE USER INTERFACE SYSTEMS AND METHODS

RELATED APPLICATIONS

The present application claims priority under 35 U.S.C. §119(e) to U.S. Provisional Patent Application No. 62/072,863, filed Oct. 30, 2014. The contents of the provisional patent application are hereby incorporated by reference in their entirety.

BACKGROUND INFORMATION

A provider of a media distribution service typically provides a user of the service with a user interface through which the user is able to interact with the service to discover and access features of the service and/or media programs that are distributed by way of the service. While conventional media service user interfaces have helped users of media distribution services to interact with the services, there remains room for improvement. For example, a conventional media service user interface compartmentalizes features of a media distribution service within the user interface in a way that makes the features of the service difficult and/or inconvenient for a user of the service to find and utilize. Consequently, the user of the service may not realize or access the full value of the service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media service user interface systems and methods are described herein. The systems and methods may provide a media service user interface for use by a user of a media service to discover and/or access features of the media service, media content such as one or more media programs distributed by way of the media service, and/or information about the media content distributed by way of the media service. For example, the media service user interface may include a set of user interface pages configured to provide a robust and seamless discovery path for use by a user to discover information about individual media programs, series of media programs, and providers of media programs. As another example, one or more pages of the media service user interface may include page content that represents an aggregation of media programs that are accessible through the media service from multiple different media content presentation sources. Examples of such pages of the media services user interface are described herein.

As described herein, the media service user interface may facilitate convenient, meaningful, and/or efficient discovery and accessing of features of the media service, media content, and/or media content information by the user of the media service. Additional or alternative benefits that may be provided by one or more of the exemplary systems and methods described herein will be made apparent herein. Exemplary systems and methods will now be described in reference to the drawings.

Figure 1:
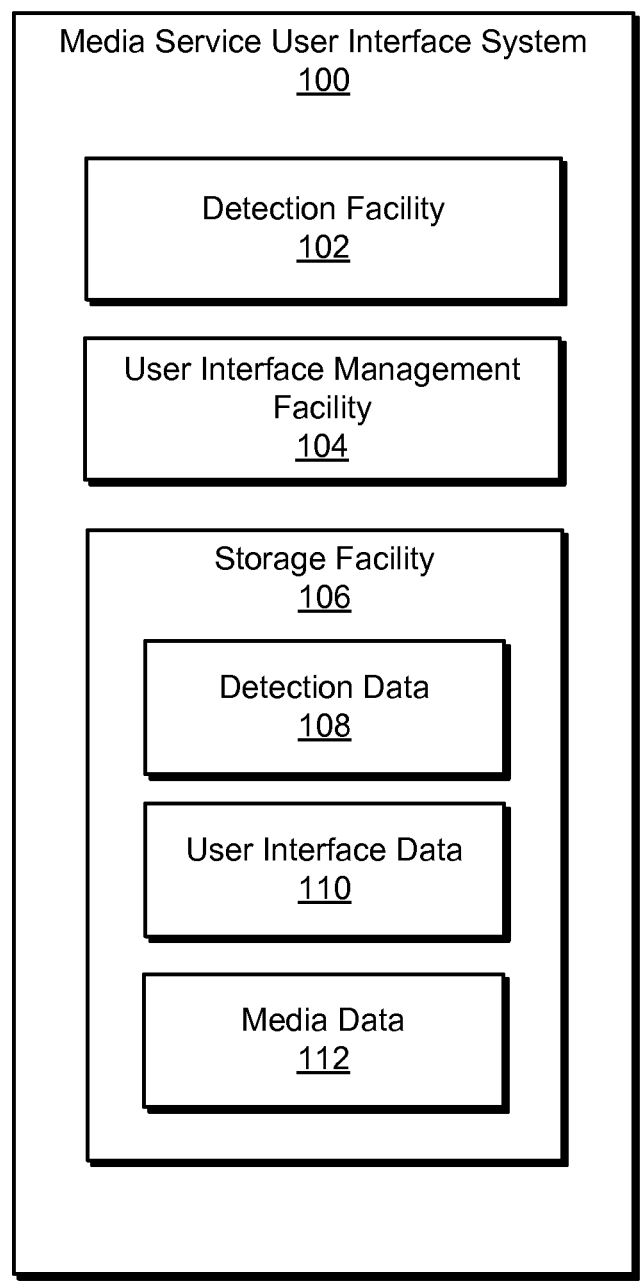
FIG. 1 illustrates an exemplary media service user interface system according to principles described herein.

FIG. 1 illustrates an exemplary media service user interface system 100 ("system 100") configured to provide a media service user interface for use by a user of a media service to discover and access features of a media service, media programs distributed by way of the media service, and/or information about media programs distributed by way of the media service. As shown, system 100 may include, without limitation, a detection facility 102, a user interface management facility 104 ("management facility 104"), and a storage facility 106 selectively and communicatively coupled to one another. Any suitable communication technologies, including any of the communication technologies mentioned herein, may be employed to facilitate communications between facilities 102-106.

Although facilities 102-106 are shown to be discrete facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations.

Facilities 102-106 of system 100 may include or be otherwise implemented by one or more physical computing devices specifically configured to perform one or more of the operations described herein. In such implementations, system 100 may be referred to as a computer-implemented system 100.

Storage facility 106 may store detection data 108, user interface data 110, and media data 112. Detection data 108 may include data generated and/or used by detection facility 102, such as data representative of a request for a media service user interface, a particular page of the media service user interface, and/or information about media content. User interface data 110 may include data used and/or generated by management facility 104, such as data representative of a media service user interface and/or user interface content. Media data 112 may include data representative of media content and/or information about media content. For example, media data 112 may include information (e.g., metadata and/or enriched metadata) about media programs distributed by way of the media service. Storage facility 106 may maintain additional or alternative data as may serve a particular implementation.

Detection facility 102 may detect an occurrence of an event predefined to trigger performance of one or more operations by management facility 104. For example, detection facility 102 may detect a request for a media service user interface, a particular page of the media service user interface, and/or information about media content. Such a request may be for a presentation of the media service user interface, the particular page of the media service user interface, and/or the information about media content to the user of the media service or for an update of the media service user interface, the particular page of the media service user interface, and/or the information about media content currently being presented to the user of the media service. Examples of requests for a media service user interface, a particular page of the media service user interface, and/or information about media content are described herein.

Management facility 104 may provide a media service user interface through which the user of the media service may interact with the media service to discover and/or access features of the media service, media programs distributed by way of the media service, and/or information about media programs distributed by way of the media service. In certain examples, the media service user interface may include a media service graphical user interface ("GUI") having one or more pages. Management facility 104 may generate a media service GUI page and provide a view of at least a portion of the media service GUI page for display on a display screen of a display device. Examples of a media service GUI, including particular media service GUI pages and page views, are described herein.

Figure 2:
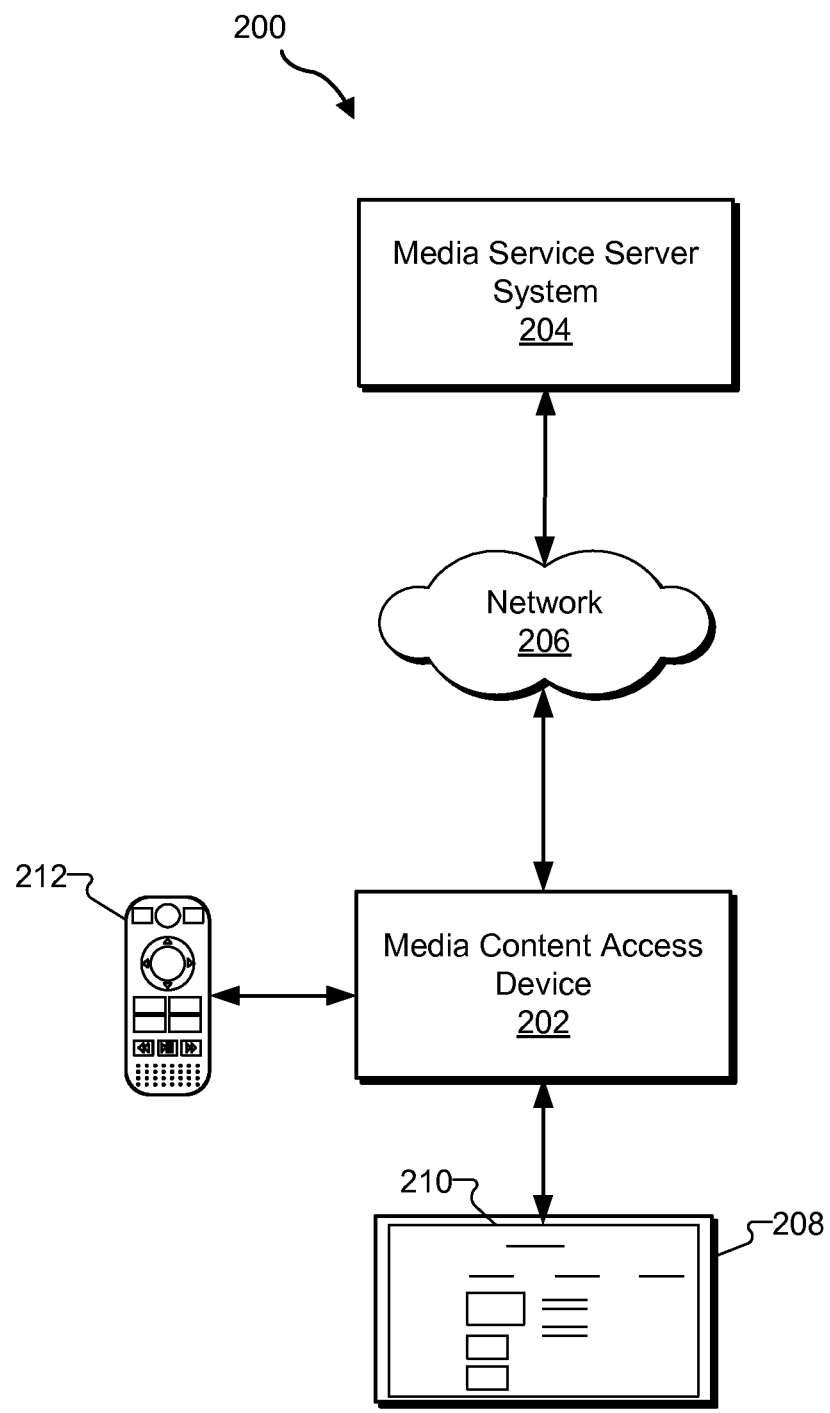
FIG. 2 illustrates an exemplary implementation of the system of FIG. 1 according to principles described herein.

FIG. 2 illustrates an exemplary implementation 200 of system 100. As shown, implementation 200 may include a media content access device 202 communicatively coupled to a media service server system 204 ("server system 204") by way of a network 206. Implementation 200 may also include a display screen 208 communicatively coupled to media content access device 202.

In implementation 200, one or more of facilities 102-106 of system 100 may be implemented entirely by media content access device 202, entirely by server system 204, or distributed across media content access device 202, server system 204, and/or display screen 208 in any manner. System 100 may alternatively be at least partially implemented by one or more computing devices or systems separate from media content access device 202 and server system 204. For example, system 100 may be at least partially implemented by a computing system maintained by a third-party entity other than a media service provider associated with server system 204.

Server system 204 and media content access device 202 may communicate using any communication platforms and technologies suitable for transporting data and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS") wireless communication technologies, Internet communication technologies, media streaming technologies, media download technologies, and other suitable communications technologies.

In certain embodiments, media content access device 202 and server system 204 may communicate via network 206. Network 206 may include, but is not limited to, one or more wireless networks (Wi-Fi networks), wireless communication networks, mobile telephone networks (e.g., cellular telephone networks), mobile phone data networks, broadband networks, narrowband networks, closed media networks, open media networks, wide area networks (e.g., the Internet), subscriber television networks, local area networks, live television transmission networks, media distribution networks, and any other networks capable of carrying media content, data (e.g., user interface data), and/or communications signals between media content access device 202 and server system 204. Communications between media content access device 202 and server system 204 may be transported using any one of the above-listed networks, or any combination or sub-combination of the above-listed networks. Alternatively, media content access device 202 and server system 204 may communicate in another way such as by one or more direct connections between media content access device 202 and server system 204.

Server system 204 may include one or more server-side computing devices. In certain examples, server system 204 may maintain and provide data to media content access device 202 for use by media content access device 202 to provide a media service user interface for use by a user of media content access device 202 to interact with the media service. Additionally or alternatively, in certain examples, server system 204 may distribute or coordinate distribution of media programs to media content access device 202 for access and use by media content access device 202 to present the media programs for consumption by a user of a media service. Server system 204 may distribute or coordinate distribution of media programs to media content access device 202 as part of the media service and using any suitable media transmission technologies (e.g., media broadcasting, multicasting, narrowcasting, streaming, and/or downloading technologies).

The media service may include any service by way of which media content is distributed to media content access device 202. For example, the media service may include a television content distribution service (e.g., a subscription television service), a service by way of which media content is distributed in accordance with a predefined distribution schedule, an on-demand media distribution service, a "look-back" or "catch-up" service through which previously distributed media content is temporarily made accessible to users of the service, and/or any other suitable type of media distribution service as may serve a particular implementation. As described herein, in certain examples, the media service may provide media content access device 202 with access to media programs by way of multiple different media content presentation sources.

Media content access device 202 may include a media content processing device (e.g., a set-top-box device, a digital video recording ("DVR") device, a television, a gaming console, a personal media player, a media server, a home media network gateway device, a tablet computer, a smartphone device, a mobile device, etc.) capable of accessing and providing media programs distributed by server system 204 for presentation to and experiencing by an end user of the media service.

Media content access device 202 may be used by the end user of the media service to access and interact with the media service. For example, the user may utilize the media content access device 202 to access one or more user interfaces (e.g., a media service user interface) provided by server system 204 and/or media content access device 202 as part of the media service, and to present the user interfaces for use by the user to discover and access features of the media service, media programs distributed as part of the media service, and/or information about the media programs distributed as part of the media service.

In certain examples, media content access device 202 may be associated with an end-user account with the media service. The account may specify features, media programs distributed by way of the media service, and/or information of the media programs distributed by way of the media service that media content access device 202 is entitled to access. For example, the account may be a television service subscription account that specifies a package of television channels that media content access device 202 is entitled to access as part of the subscription. Based on the account, the media content access device 202 may be granted access to certain channels and/or media programs associated with the channels at no additional charge (e.g., no purchase or rental fee on top of a subscription fee). Based on the account, media content access device 202 may be granted access to certain other channels and/or media programs associated with the other channels only if an additional charge (e.g., an increased subscription fee, a transactional purchase or rental fee, etc. on top of the subscription fee) is paid.

In some examples, media content access device 202 may present media programs and/or one or more user interfaces associated with the media service by way of display screen 208. Display screen 208 may include a television, display monitor, and/or any other device separate from media content access device 202, as shown in FIG. 2. Alternatively, display screen 208 may be integrated into media content access device 202. For example, display screen 208 may include a display screen integrated into a tablet computer or smart phone device.

Management facility 104 may provide a media service GUI 210 for display on display screen 208. The displayed media service GUI 210 may include any particular page view of the media service GUI 210, including any of the exemplary views of media service GUI pages described herein.

In certain examples, a remote control device 212 may be communicatively coupled to media content access device 202 (e.g., by any suitable wireless communication technology such as infrared signaling, radio frequency signaling, BLUETOOTH, Wi-Fi, etc.) and used by the user of media content access device 202 to control operations of the media content access device 202. For example, the user may utilize the remote control device 212 to provide input to the media content access device 202. In certain examples, the remote control device 212 may include a directional pad for use by the user to provide directional input (e.g., via left, right, up, and down directional arrow buttons) and selection input (e.g., via a selector button) to navigate within media service GUI 210 displayed on display screen 208. Additionally or alternatively, in certain examples, the remote control device 212 may include a microphone through which voice input commands may be received from a user and processed as input to navigate within media service GUI 210.

In certain examples, media content may be accessible to media content access device 202 through the media service by way of multiple different media content presentation sources. In such examples, media content access device 202 may access media content from any of the presentation sources for processing and presentation of the media content to the user of media content access device 202. Certain media content may be available for access from only one of the presentation sources of the media service while other media content may be available for access from more than one of the presentation sources of the media service.

Figure 3:
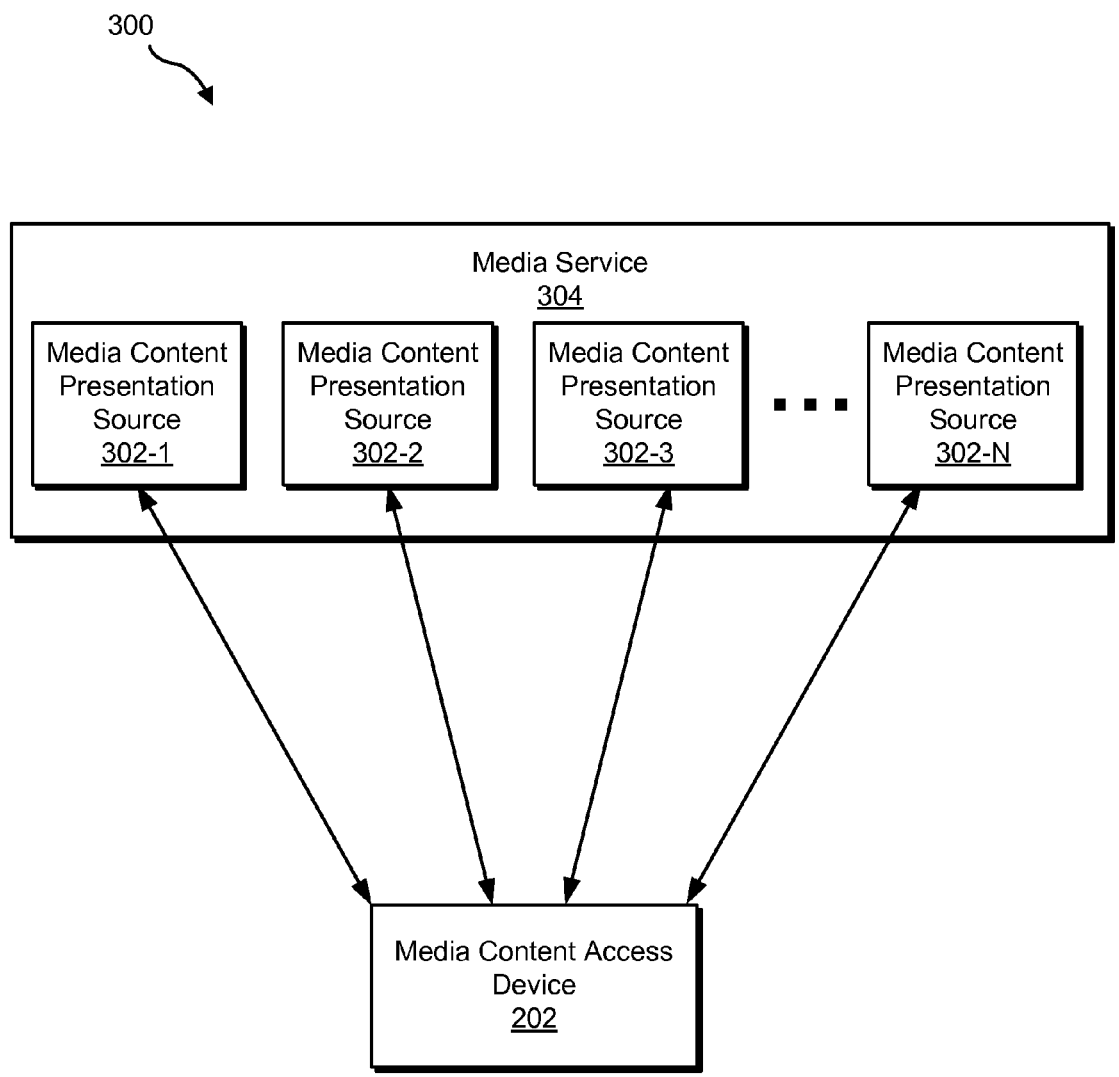
FIG. 3 illustrates an exemplary configuration in which a media content access device is provided with access to media content by way of multiple different media content presentation sources of a media service according to principles described herein.

FIG. 3 illustrates an exemplary configuration 300 in which media content access device 202 is provided with access to media content by way of multiple different media content presentation sources 302 (e.g., media content presentation sources 302-1 through 302-N) of a media service 304. Media content access device 202 may use any of the presentation sources 302 to access and present media content to the user of media content access device 202. The presentation sources 302 may be different media content access platforms by way of which media content access device 202 may access media content for presentation to the user.

For example, a presentation source may include a scheduled media content presentation source that distributes media programs in accordance with a predefined distribution schedule. For instance, the presentation source may include a television programming source (e.g., a broadcast or multicast television programming source, a subscription television service source, a pay-per-view television source, etc.) that distributes television programs by way of television channels in accordance with a predefined television programming schedule.

Another presentation source may include a "look-back" or "catch-up" media content presentation source that provides temporary access to media programs that have been previously distributed by the scheduled media content presentation source in accordance with the distribution schedule. A look-back media content presentation source may include a network-based server system or the like that automatically records all media programs as the media programs are distributed by the scheduled media content presentation source and provides access to the recorded media programs for a predetermined period of time (e.g., three days) after the media programs were distributed and recorded.

Another presentation source may include a DVR media content presentation source that provides access to recordings of one or more of the media programs previously distributed by the scheduled media content presentation source in accordance with the distribution schedule. The DVR media content presentation source may record select media programs as the media programs are distributed by the scheduled media content presentation source. The DVR media content presentation source may select which media programs to record based on recording instructions provided by the user of media content access device 202. The recordings may be stored locally at media content access device 202 (to local memory in media content access device 202 by a DVR device in the media content access device 202), in which case the DVR media content presentation source is local to media content access device 202. Additionally or alternatively, the recordings may be stored remotely of media content access device 202 at a network DVR device, in which case the DVR media content presentation source is remote of the media content access device 202.

Another presentation source may include an on-demand media content presentation source that provides on-demand access to media programs. The on-demand media content presentation source may include a network server device or the like (e.g., one or more data centers) configured to stream media content to media content access device 202 over a network (e.g., over a subscription television service network and/or the Internet) on-demand.

The above-described presentation sources are illustrative only. Additional or alternative presentation sources may be used in connection with the methods and systems described herein as may serve a particular implementation.

As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the media service. Such media programs that are made available for user consumption through a media service may be accessed and/or played back by an appropriately configured media content access device for presentation to a user of the media content access device.

In certain examples, a set of media programs, such as episodes of a particular show, may be referred to as a media program series. For example, a television show may include a series of episodes of the show. The episodes of the television show are typically released for distribution over time (e.g., one episode per week). The episodes may be released during different seasons of the show. For example, a first set of episodes may be released during a first season of the show, a second set of episodes may be subsequently released during a second season of the show, and so on. As used herein, the term "media program series" may refer to a set of media programs that are episodes of the same television show (e.g., episodes of a television show known as "Seinfeld").

Media programs that are distributed by way of the media service may be received by a provider of the media service from multiple different media program providers. As used herein, the term "media program provider" may refer to an entity (e.g., a studio, a network, etc.) that creates and/or sources one or more media programs to the provider of the media service for distribution of the media programs by way of the media service to end users of the media service. Examples of media program providers include ABC, CNN, ESPN, HBO, etc.

As stated above, management facility 104 may provide a media service user interface such as a media service GUI (e.g., media service GUI 210) that has one or more pages. In certain examples, each page of the media service GUI may be dedicated to presenting a particular grouping of information about features of the media service, media programs distributed by way of the service, and/or providers of the media programs. Exemplary media service GUI pages and content, tools, configurations, and views thereof will now be described. The examples are illustrative only. A media service user interface provided by management facility 104 may include additional or alternative media service GUI pages and/or content, tools, configurations, and/or views thereof as may suit a particular implementation.

Figure 4:
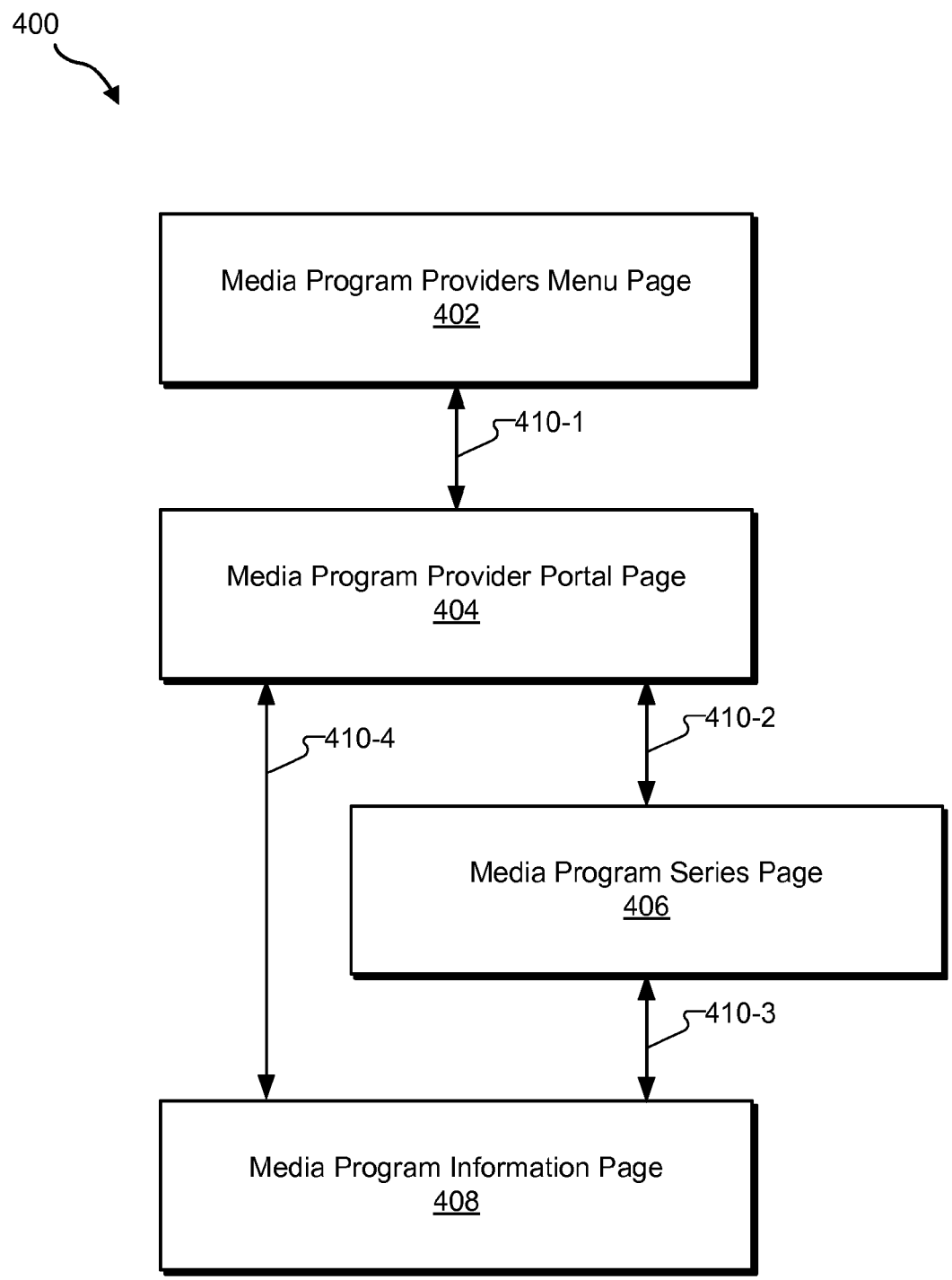
FIG. 4 illustrates an exemplary configuration of pages of a media service user interface according to principles described herein.

FIG. 4 illustrates an exemplary configuration 400 of pages of a media service GUI. As shown, configuration 400 may include a media program providers menu page 402 ("providers menu page 402"), a media program provider portal page 404 ("provider portal page 404"), a media program series page 406 ("series page 406"), and a media program information page 408 ("information page 408").

Each of the pages may be dedicated (e.g., exclusively) to presenting a particular grouping of information about features of the media service, media programs distributed by way of the service, and/or providers of the media programs. For example, providers menu page 402 may be dedicated to presenting a menu of media program providers that provide media programs for distribution by way of the media service, provider portal page 404 may be dedicated to presenting information about an individual media program provider that provides media programs for distribution by way of the media service, series page 406 may be dedicated to presenting information about a media program series, and information page 408 may be dedicated to presenting information about an individual media program. To illustrate, information page 408 may include information about an individual media program such as a particular episode of a media program series, series page 406 may include information about the media program series, provider portal page 404 may include information about the media program provider that provides the media program series, and providers menu page 402 may include a menu of the media program provider and one or more other media program providers that provide media programs for distribution by way of the media service.

In FIG. 4, arrows 410 (e.g., arrows 410-1 through 410-4) represent navigation paths between the pages. For example, arrow 410-1 interconnecting providers menu page 402 and provider portal page 404 represents a two-directional navigation path between providers menu page 402 and provider portal page 404, which navigation path allows the user of the media service to navigate from providers menu page 402 to provider portal page 404 and/or from provider portal page 404 to providers menu page 402. Similarly, an arrow 410 interconnecting any two other pages represents a two-directional navigation path between those two pages.

Configuration 400 may provide a robust and seamless discovery path for use by the user of the media service to discover information about individual media programs that are available for access through the media service, series of media programs that are available for access through the media service, and providers of media programs as well as any offering by those providers that are available through the media service. From any page within configuration 400, the user may navigate to any other page within configuration by way of the navigation paths represented by arrows 410.

The user may enter configuration 400 from any suitable point within the media service GUI. Entry into configuration 400 may include accessing any page within configuration 400 from any page of the media service GUI not included in configuration 400. For example, while a view of a page other than any of the pages of configuration 400 is displayed on a display screen (examples of such pages include, without limitation, a program guide page, a search page, a DVR page, a home page, a watch list page, and a main menu page), the user may provide input to navigate to one of the pages included in configuration 400, such as by providing input to request a particular page or to request information about media program providers, a particular media program provider, a media program series, or an individual media program. To illustrate, while a page other than providers menu page 402, provider program page 404, series page 406, and information page 408 is displayed, the user may provide input to request information about a media program series. Detection facility 102 may detect the request, and management facility 104 may respond to the request by providing series page 406 for the media program series for display. From the displayed series page 406, the user may provide input to navigate directly to provider portal page 404 (e.g. to access information about a provider of the media program series) or information page 408 (e.g., to access information about a particular episode in the media program series). While this example illustrates an entry into configuration 400 at series page 406, similar operations may be performed in association with an entry into configuration 400 at providers menu page 402, provider portal page 404, or information page 408.

In this or a similar manner, a user may start at any entry point in configuration 400 and conveniently and seamlessly discover various levels and groupings of information, which may help the user to discover features of the media service that are available to the user. To illustrate one example, the user may search for media content having certain attributes specified by the user. Management facility 104 may present a list of search results to the user. The user may select, from the list, a media program that is of interest to the user. The media program may be an episode of a media program series, and, in response to the user selection, management facility 104 may provide information page 408 for the episode for display. From information page 408, the user may navigate to series page 406 to access information about the media program series (e.g., other episodes of the series and/or availability of other episodes of the series through the media service). From series page 406, the user may access another episode or information about another episode (e.g., information page 408 for the other episode), or the user may navigate to provider portal page 404 to access information about the provider of the media program series, such as information about other media programs offered by the provider that are available through the media service (e.g., as part of a subscription of the user with the media service, through a transaction, and/or as part of an upgrade to the subscription of the user with the media service).

In response to a request for a media service GUI page (e.g., a request for the type of information the page is dedicated to presenting), management facility 104 may generate the media service GUI page by determining information to be included in the media service GUI page and populating the media service GUI page with page content that represents the determined information.

To illustrate one example, detection facility 102 may detect a request for information about a media program series. In response to the request, management facility 104 may generate a media program series page (e.g., series page 406) for the media program series. The generation of the media program series page may include management facility 104 determining episodes of the media program series that are available for access by media content access device 202 through the media service and populating the media program series page with page content that represents the episodes of the media program series that are available for access by media content access device 202 through the media service.

In certain examples, generation of a media service GUI page by management facility 104 may include management facility 104 determining, across multiple different media content presentation sources (e.g., presentation sources 302) by way of which media content is accessible through the media service for presentation by media content access device 202, information to be included in the media service GUI page. Management facility 104 may determine information across multiple different media content presentation sources in any suitable way. As an example, management facility 104 may query one or more catalogues that include data indicating media programs that are accessible by way of the multiple different media content presentation sources to obtain information about the media programs and/or how the media programs are accessible by media content access device 202 through the media service.

By determining the information across multiple different media content presentation sources, management facility 104 may generate a media service GUI page that includes page content that represents an aggregation of information from the multiple different media content presentation sources. For example, the media service GUI page may include page content representing information obtained from any combination of a scheduled media content presentation source that distributes media programs in accordance with a distribution schedule, a look-back media content presentation source that provides temporary access to the media programs previously distributed by the scheduled media content presentation source in accordance with the distribution schedule, a DVR media content presentation source that provides access to recordings of one or more of the media programs previously distributed by the scheduled media content presentation source in accordance with the distribution schedule, and an on-demand media content presentation source that provides on-demand access to media programs. Such an aggregation of information from multiple different media content presentation sources in a single media service GUI page may help the user of the media service conveniently discover media programs and/or features of the media service that are available to the user.

To illustrate one example, generation of a media program series page may include management facility 104 determining, across multiple different media content presentation sources, episodes of the media program series that are available for access by media content access device 202 through the media service and populating the media program series page with page content that represents the episodes of the media program series that are available for access by media content access device 202 through the media service. In certain examples, management facility 104 may determine that a first episode is available for access by way of a first media content presentation source and that a second episode is available for access by way of a second media content presentation source. Management facility 104 may then populate the media program series page with page content that represents the first episode available for access by way of the first media content presentation source and the second episode available for access by way of the second media content presentation source.

In certain examples, management facility 104 may determine that a media program is available for access from multiple different media content presentation sources. In such examples, management facility 104 may select one of the media content presentation sources to associate with the media program in a media service GUI page being generated by management facility 104.

In certain examples, management facility 104 may select one of the media content presentation sources based on a predefined media content presentation source prioritization heuristic, which may specify one or more prioritization conditions for use in selecting a presentation source. The one or more prioritization conditions may indicate any suitable factors and/or logic for use by management facility 104 to select a presentation source form among multiple different presentation sources. Examples of prioritization conditions include, without limitation, conditions specifying that a prioritization source that requires use of the least amount of resources (e.g., processing, memory, media content streaming, and/or network bandwidth resources) be selected, conditions specifying that a prioritization source that is financially least expensive for the user, the media program provider, and/or the media service provider be selected, conditions specifying that user patterns be considered (e.g., historical interaction patterns that show a user preference for a presentation source), conditions specifying that user-defined preferences for a presentation source be considered, conditions specifying that a prioritization source that offers the least or most amount of exposure to advertisements be select, and any combination or sub-combination of such conditions. One or more prioritization conditions may be used by management facility 104 to select a presentation source that is a best option for the user and/or the provider of the media service.

To illustrate one example, as part of generating a media program series page, management facility 104 may determine that an episode of the media program series is available for access by media content access device 202 from first and second media content presentation sources. Management facility 104 may apply the predefined presentation source prioritization heuristic to select one of the presentation sources to be associated with the episode in the media program series page. Management facility 104 may then populate the media program series page with page content that represents the episode that is available for access from the selected presentation source.

In certain examples, the page content may visually indicate the selected presentation source associated with the episode in the media program series page. For example, the page content may include a presentation source badge that indicates how the episode is accessible, such as by indicating that the episode will be accessible through a scheduled media content distribution presentation source at an upcoming date and/or time, is accessible through a look-back presentation source, is a recording accessible by way of a DVR presentation source, or is accessible on-demand by way of an on-demand presentation source.

One or more pages of the media service GUI may utilize a particular layout of page content. In certain examples, each of the media service GUI pages in configuration 400 may utilize the same or a similar layout of page content to provide navigational uniformity and content discovery across the pages.

Figure 5:
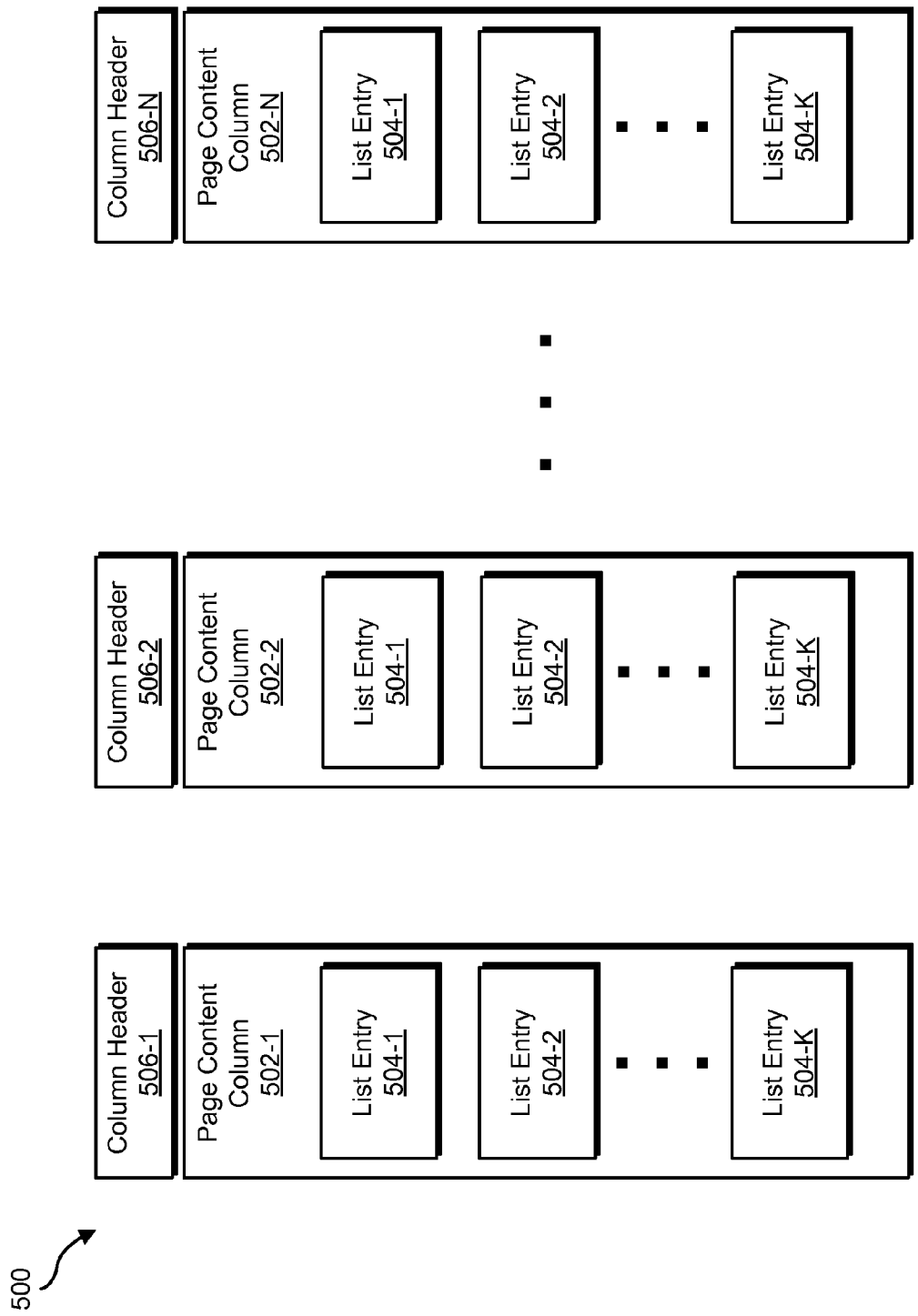
FIG. 5 illustrates an exemplary configuration of user interface page content according to principles described herein.

FIG. 5 illustrates an exemplary configuration 500 of page content that may be included in a media service GUI page. In configuration 500, page content may be organized into a row of page content columns 502 (e.g., page content columns 502-1 through 502-N). Each page content column 502 may include a vertical list of list entries 504 (e.g., list entries 504-1 through 504-K). As part of generating a media service GUI page that utilizes the layout configuration 500 of page content illustrated in FIG. 5, management facility 104 may select page content in accordance with the configuration 500. For example, management facility 104 may identify and arrange page content columns 502 to form a row of page content columns 502. In addition, for each page content column 502, management facility 104 may identify and arrange list entries 504 within the respective page content column 504.

Management facility 104 may select the page content columns 502 and/or the list entries 504 dynamically in response to a request for a media service GUI page and/or based on one or more predefined page content selection factors for the media service GUI page. The predefined page content selection factors may include any set of factors (e.g., user preferences, user interaction history with the media service, media content distribution schedule, current date and time, media content availability, etc.) that may be used by management facility 104 to select page content for inclusion a media service GUI page. The selection of the page content may include identifying and prioritizing the page content for display arrangement within the media service GUI page. Dynamic selection of page content for inclusion in the media service GUI page may surface meaningful content to the user.

The row of page content columns 502 in configuration 500 may form a menu of navigable and selectable menu options. As shown in FIG. 5, for example, configuration 500 may include a row of column headers 506 (e.g., column headers 506-1 through 506-N) positioned as headers for the page content columns 502. Column headers 506 may form a menu of navigable and selectable column header menu options that represent the respective page content columns 502. A vertical list of list entries 504 within a page content column 502 may form a sub-menu of navigable and selectable sub-menu options for the column header 506 representing the page content column 502.

The row of page content columns 502 and column headers 506 may be scrollable within a view of the media service GUI page such that the user may provide input to navigate from one page content column 502 and/or column header 506 to another, which navigation may cause the row of page content columns 502 and column headers 506 to scroll relative to the display screen on which the view of the media guide GUI page is displayed.

In certain examples, the navigation may include movement of a highlighter object (not shown) relative to the page content columns 502 and column headers 506 and/or movement of the page content columns 502 and column headers 506 relative to the highlighter object. A page content column 502 in which the highlighter object is positioned (e.g., by positioning of the highlighter object on the column header 506 for the page content column or on a list entry 504 within the page content column 502) may function as an active page content column 502.

When active, a page content column 502 may be vertically navigable. In certain examples, vertical navigation within the page content column 502 may include movement of the highlighter object relative to the list of entries 504 within the page content column 502 and/or movement of the list of entries 504 relative to the highlighter object. The list of entries 504 may be scrollable such that navigation from one entry 504 to another entry 504 in the list may cause the list of entries 504 to scroll relative to the display screen on which a view of the media guide GUI page is displayed.

The user may provide input to navigate to a particular column header 506 for a particular page content column 502. A highlighting of the column header 506 may activate the page content column 502, which may trigger a presentation of the page content column 502 and/or information about the page content column 502 beneath the column header 506. The user may than provide input to navigate within the page content column 502, such as to a particular entry 504 within the list of entries 504 included in the particular page content column 502.

In certain examples, when a particular list entry 504 is highlighted, management facility 104 may spatially expand the highlighted list entry 504 on the display screen. For example, the screen space allocated to the list entry 504 may expand and/or the size of the list entry 504 may expand relative to other list entries 504. Management facility 104 may populate the expanded list entry 504 with additional information about a subject represented by the list entry 804, such as additional metadata information (e.g., episode name, closed captioning information, rating information, badge information indicating whether the media program is newly available, soon to become unavailable, included in a watch list, etc.) about a media program represented by the list entry 504.

Management facility 104 may provide a view of at least a portion of a generated media service GUI page for display on a display screen. In certain examples, management facility 104 may provide an entire media service GUI page for display. In other examples, management facility 104 may provide only a portion of the media service GUI page for display. Management facility 104 may provide only a portion of the media service GUI page for display in any suitable way, such as by providing only a subset of media service GUI page data for processing and display by the display device and/or by hiding other portions of the media service GUI page from view on the display screen. In certain examples, only a subset of the page content columns 502 included in a selected set of page content columns 502 and/or only a subset of entries 504 included in a list of entries 504 is displayed on a display screen at a given time. In such examples, navigation within the page content columns 502 or the list of entries 504 may cause scrolling of page content columns 502 or list entries 504 on and off screen. In certain examples, management facility 104 may provide only a portion of the media service GUI page for display by providing only an active page content column 502 for display and not providing inactive page content columns 502 for display (e.g., by hiding inactive page content columns 502 from display).

Exemplary views of media service GUI pages will now be described. One or more features described in reference to a particular view of a particular media service GUI page may also apply to another view of the same media service GUI page and/or to a view of another media service GUI page.

Figure 6:
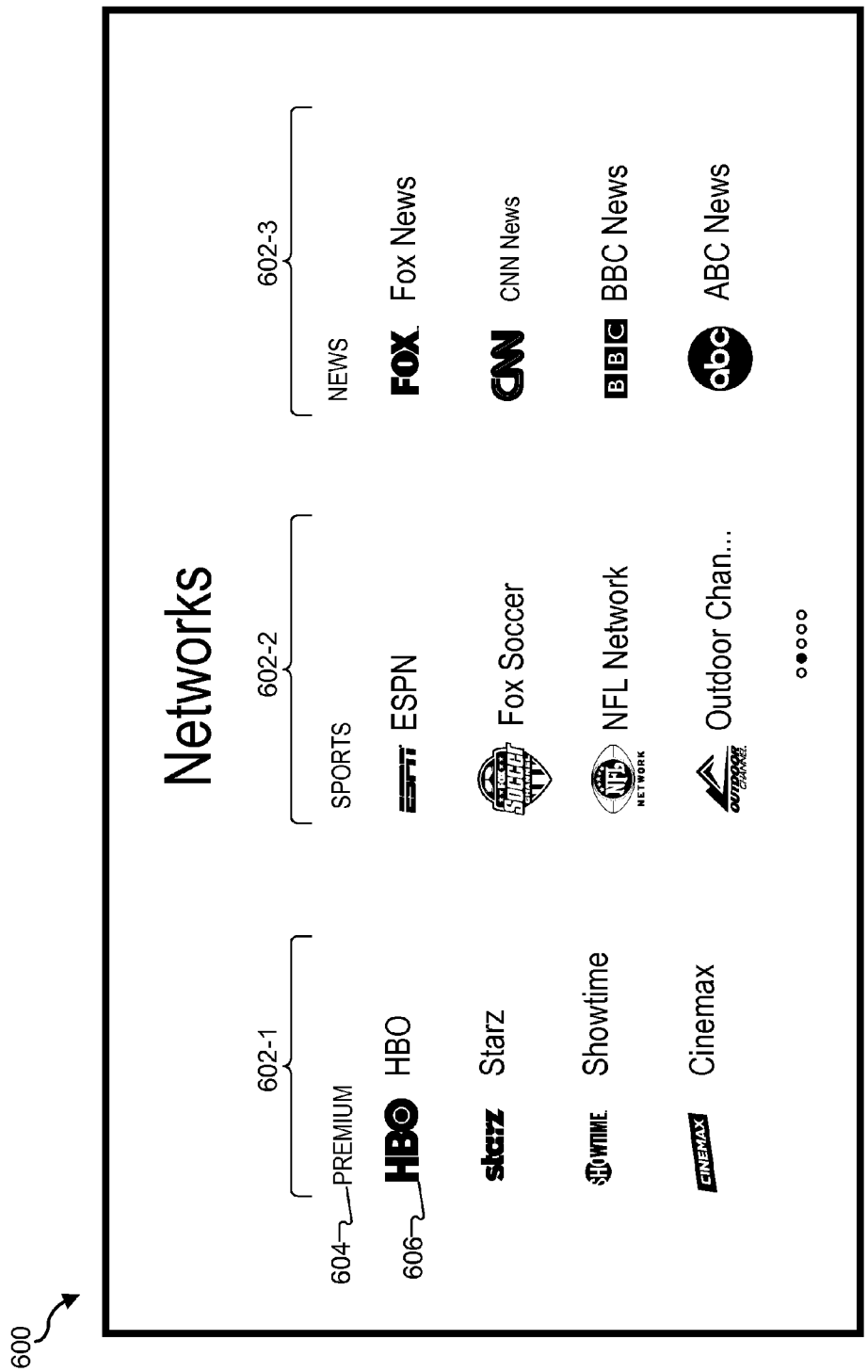
FIGS. 6-16 illustrate exemplary media service graphical user interface page views according to principles described herein.

FIG. 6 illustrates an exemplary view 600 of providers menu page 402 that may be provided by management facility 104 for display on a display screen. As shown, view 600 may include a row of page content columns in the form of media category columns 602 (e.g., media category columns 602-1 through 602-3). Each media category column 602 may represent a category of media content, which may be any categorization of media content based on one or more attributes of media programs, media channels, and/or media program providers. In the illustrated example, media category column 602-1, which is labeled "premium," is dedicated to representing media program providers that provide premium media content (e.g., media content provided on one or more media channels that may require an increased subscription fee compared to a lower-tier subscription package), media category column 602-2, which is labeled "sports," is dedicated to representing media program providers that provide media content related to sports, and media category column 602-3, which is labeled "news," is dedicated to representing media program providers that provide media content related to news.

Each media category column 602 may be associated with (e.g., displayed beneath) a media category column header, which may indicate the category of the respective media category column 602. For example, media category column 602-1 has a column header 604 in the form of text indicating the media category represented by media category column 602-1. The row of column headers may form a menu of navigable and selectable column header menu options.

A user selection of a list entry in one of the media category columns 602 may trigger a display of a view of a provider portal page 404 for a media program provider represented by the entry. For example, detection facility 102 may detect a user selection of list entry 606 representing a media program provider known as "HBO" as a request for information about the media program provider (e.g., a request for a provider portal page 404 for the media program provider).

Figure 7:
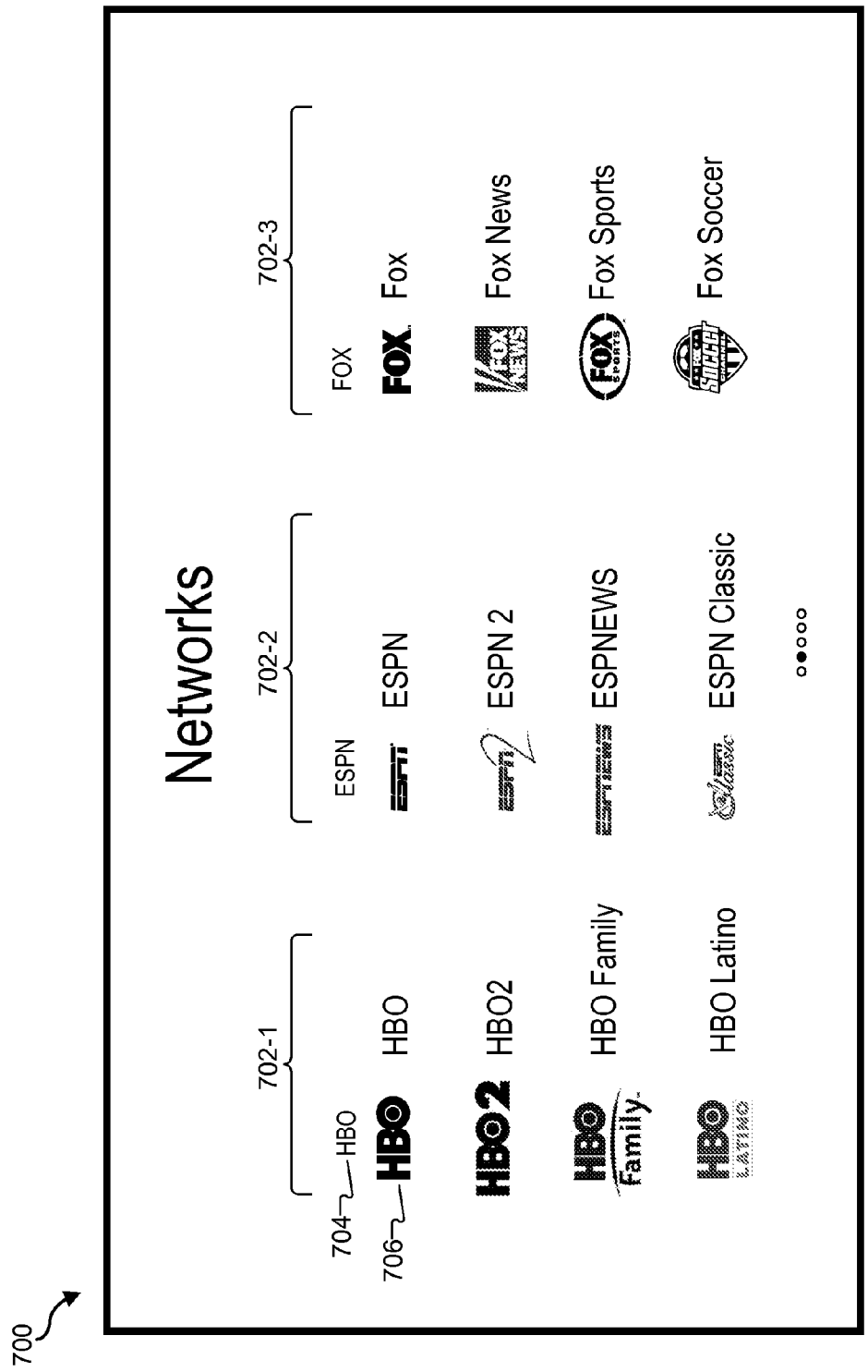

FIG. 7 illustrates another exemplary view 700 of providers menu page 402 that may be provided by management facility 104 for display on a display screen. As shown, view 700 may include a row of page content columns in the form of media program provider columns 702 (e.g., media program provider columns 702-1 through 702-3). Each media program provider column 702 may represent a particular media program provider. In the illustrated example, media program provider column 702-1, which is labeled "HBO," is dedicated to representing media channels that carry media programs provided by a media program provider known as "HBO," media program provider column 702-2, which is labeled "ESPN," is dedicated to representing media channels that carry media programs provided by a media program provider known as "ESPN," and media program provider column 702-3, which is labeled "FOX," is dedicated to representing media channels that carry media programs provided by a media program provider known as "FOX." As shown, each media program provider column 702 includes a list of entries that represent media channels of the respective media program provider.

Each media program provider column 702 may be associated with (e.g., displayed beneath) a media program provider column header, which may indicate the media program provider associated with the respective media program provider column 702. For example, media program provider column 702-1 has a column header 704 in the form of text indicating the media program provider represented by media program provider column 702-1. The row of column headers may form a menu of navigable and selectable column header menu options.

A user selection of a column header menu option for a media program provider column 702 or a user selection of a list entry in one of the media program provider columns 702 may trigger a display of a view of a provider portal page 404 for a media program provider represented by the column header or entry. For example, detection facility 102 may detect a user selection of list entry 706 representing a media channel known as "HBO" as a request for information about the media program provider (e.g., a request for a provider portal page 404 for the media program provider).

Figure 8:
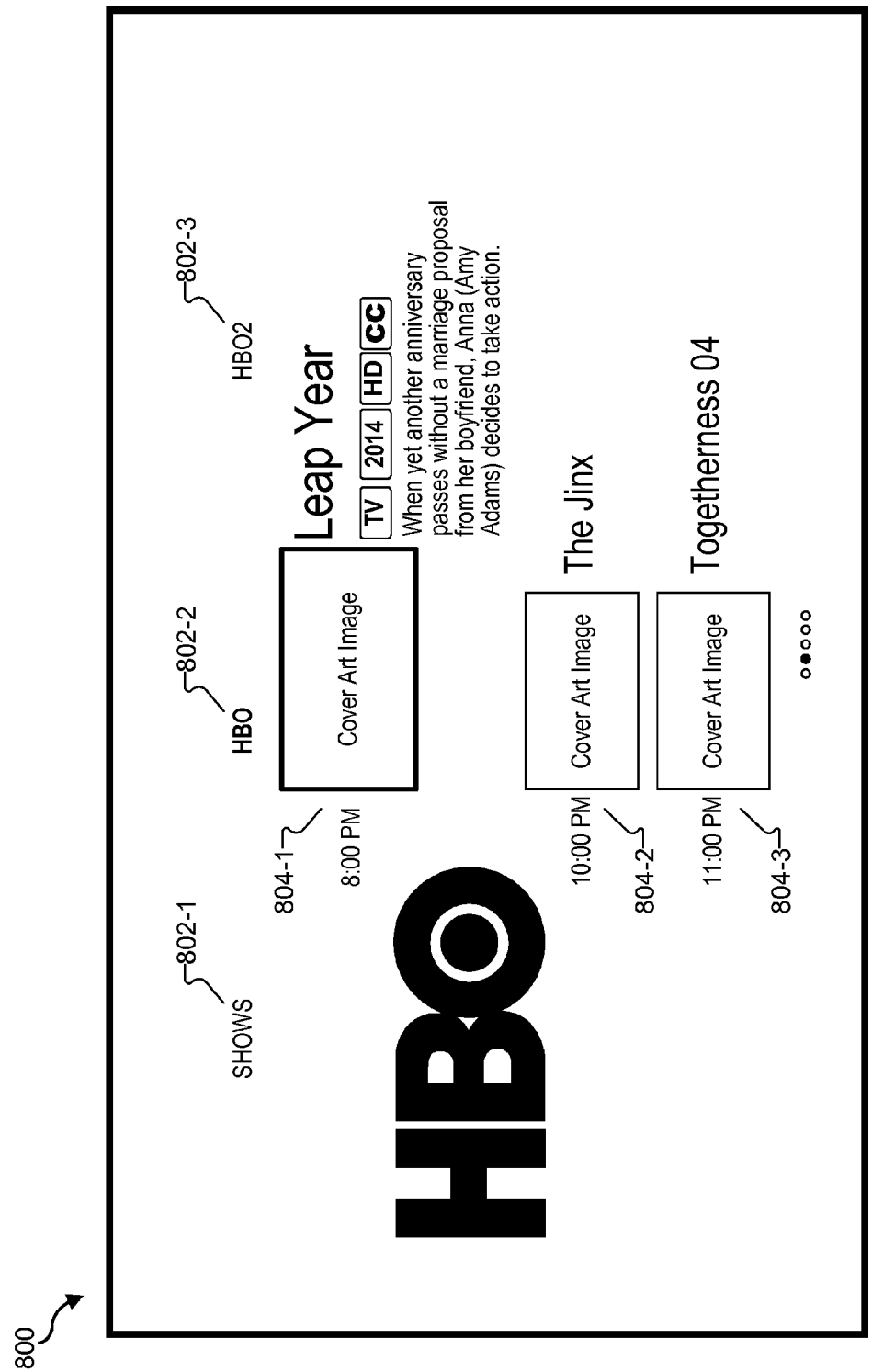

FIG. 8 illustrates an exemplary view 800 of provider portal page 404 that may be provided by management facility 104 for display on a display screen. As shown, view 800 may include a row of column headers 802 (e.g., column headers 802-1 through 802-3), each of which may represent a page content column. In the illustrated example, for instance, column header 802-1 may represent a page content column of media programs provided by the media program provider represented by the provider portal page 404, column header 802-2 may represent a page content column of media programs distributed by way of a particular media channel associated with the media program provider represented by the provider portal page 404, and column header 802-3 may represent a page content column of media programs distributed by way of another particular media channel associated with the media program provider represented by the provider portal page 404.

Column headers 802 may form a menu of navigable and selectable column header menu options that represent the respective page content columns. A vertical list of entries 804 within a page content column may form a sub-menu of navigable and selectable sub-menu options for the column header 802 representing the page content column.

In FIG. 8, the page content column represented by column header 802-2 is active (e.g., based on a highlight selection of column header 802-2 or an entry within the page content column). Accordingly, a list of entries 804 (e.g., entries 804-1 through 804-3) included in the active page content column is displayed in view 800. As shown, the entries 804 represent media programs distributed on the media channel represented by column header 802-2. Each entry 804 may include information about a media program, such as a scheduled time of distribution (e.g., a start time of a distribution time slot), a cover art image, a title, a synopsis, and other information about the media program. In FIG. 8, entry 804-1 is highlighted, which triggered the display of additional information about the media program represented by entry 804-1, as compared to information for other entries 804.

The list of entries 804 may be arranged in accordance with and represent a distribution schedule of media programs on the media channel represented by column header 802-2. As shown, the list of entries 804 indicates a scheduled distribution start time for each media program. In the illustrated example, a media program that is currently being distributed (i.e., a currently airing program) is represented by entry 804-1, and entries 804 (e.g., entries 804-2 and 804-3) positioned below entry 804-1 chronologically represent media programs scheduled to be distributed at later times. The page content column may also include additional entries 804 positioned above entry 804-1 (which may be off-screen of view 800 and scrollable downwardly into view 800) and that chronologically represent media programs that were distributed at earlier times. Accordingly, a user may provide input to cause the entries 804 in the page content column to scroll up or down to discover information about previously-aired media programs and media programs that are scheduled to air later on the media channel.

The user may provide input to cause the row of column headers 802 to scroll right or left within view 800. In this manner, the user may navigate to and select another column header 802 to activate a different page content column represented by the other column header 802.

Figure 9:
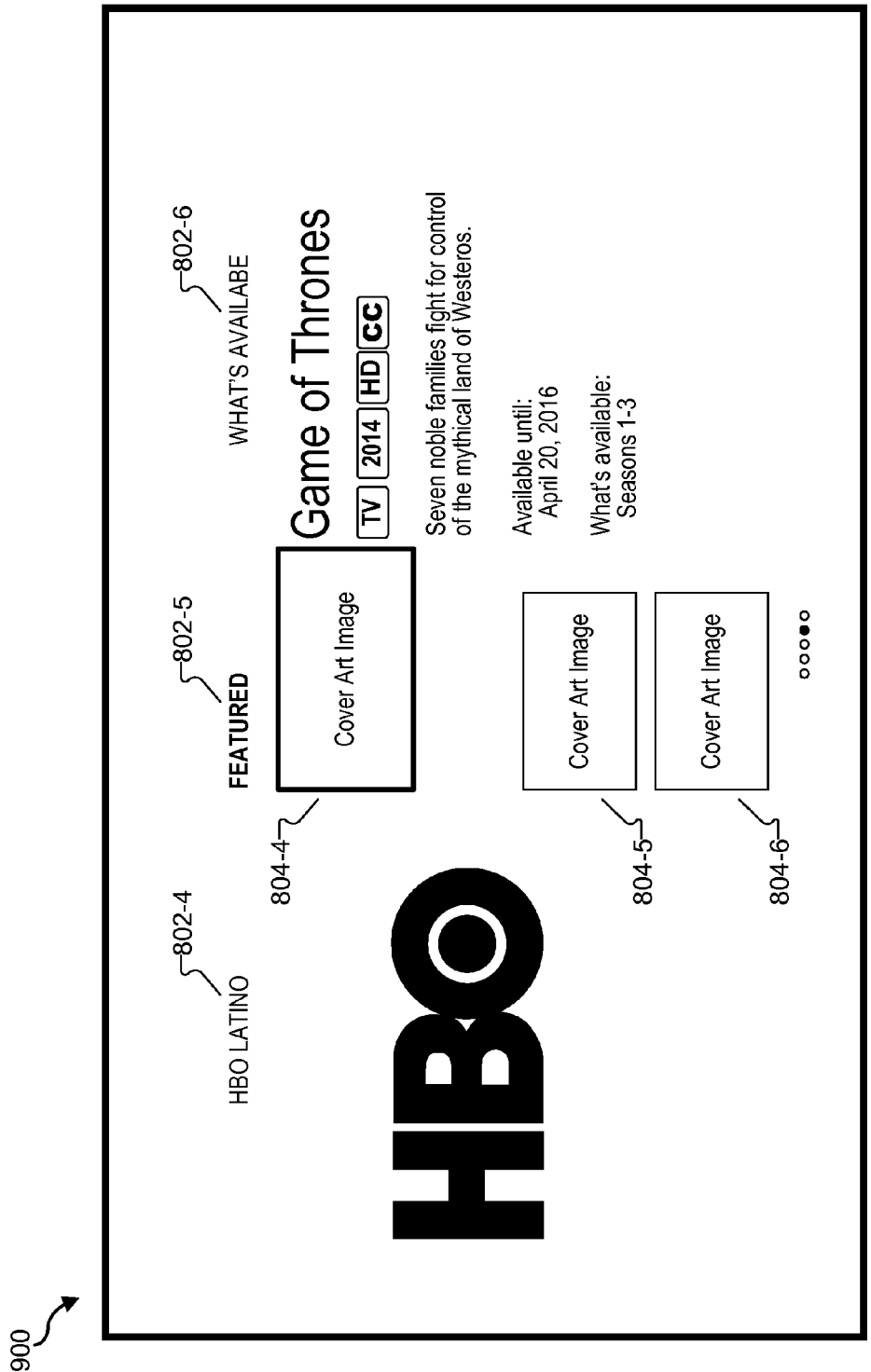

FIG. 9 illustrates another exemplary view 900 of provider portal page 404 that may be provided by management facility 104 for display on a display screen. As shown, view 900 may include a different set of column headers 802 (e.g., column headers 802-4 through 802-6) as may be displayed after the row of column headers 802 has been scrolled. Column header 802-5 may be selected and a list of entries 804 (e.g., entries 804-4 through 804-6) displayed within a page content column below column header 802-5.

Views of provider portal page 404 may help the user to discover content by provider, such as by discovering media programs and/or other offerings made available by the media program provider represented by the provider portal page 404. For example, a user may utilize a view of provider portal page 404 to browse a catalogue of media program provided by a specific media program provider and/or to add such media programs to a watch list.

While FIGS. 8-9 illustrate certain exemplary features of the provider portal page 404, other features may be provided in other views of the provider portal page 404. For example, the provider portal page 404 may include various header columns such as, but not limited to, a column header representing a page content column that includes page content representing media programs provided by the media program provider, a column header for each media channel on which media programs provided by the media program provider are distributed, a column header representing a page content column that includes page content representing media programs being featured by the media program provider and/or the provider of the media service, a column header representing a page content column that includes page content representing a custom category of media programs (e.g., a custom category defined by an end user of the media service), a column header representing a page content column that includes page content representing clips and/or web-based episodes of media programs provided by the media program provider, and/or any other suitable column header.

In view 800 or view 900 of provider portal page 404, a user selection of a list entry 804 may trigger a display of a view of a series page 406 for a media program series or of an information page 408 for an individual media program. For example, if the selected entry 804 represents an individual media program, management facility 104 may provide a view of the information page 408 for the media program for display. If, on the other hand, the selected entry 406 represents a media program series, management facility 104 may provide a view of the series page 406 for the media program series for display.

Figure 10:
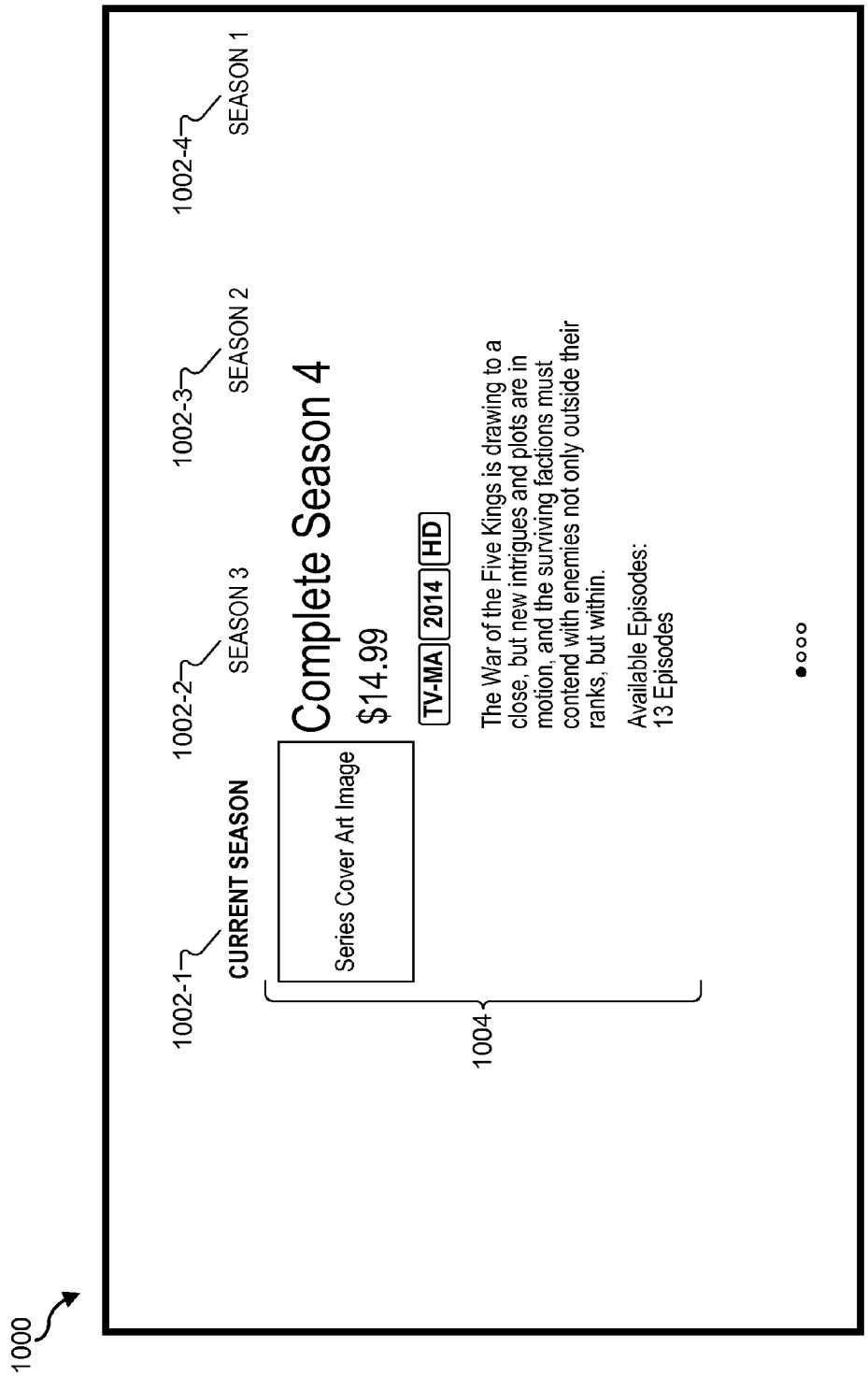

FIG. 10 illustrates an exemplary view 1000 of series page 406 that may be provided by management facility 104 for display on a display screen. In certain examples, management facility 104 may provide view 1000 for display in response to a user selection of entry 804-4 in view 900 of FIG. 9, and view 1000 may include page content dedicated to presenting information about a media program series titled "Game of Thrones."

As shown in FIG. 10, view 1000 may include a row of column headers 1002 (e.g., column headers 1002-1 through 1002-4), each of which may represent a page content column. In the illustrated example, for instance, column header 1002-1 may represent a page content column of media programs included in a current season of the media program series (e.g., a fourth season of the media program series in the illustrated example), column header 1002-2 may represent a page content column of media programs included in the immediately previous season of the media program series (e.g., a third season of the media program series in the illustrated example), column header 1002-3 may represent a page content column of media programs included in the next previous season of the media program series (e.g., a second season of the media program series in the illustrated example), and column header 1002-4 may represent a page content column of media programs included in the next previous season of the media program series (e.g., a first season of the media program series in the illustrated example).

Column headers 1002 may form a menu of navigable and selectable column header menu options that represent the respective page content columns. A vertical list of entries within a page content column may form a sub-menu of navigable and selectable sub-menu options for the column header 1002 representing the page content column.

In FIG. 10, column header 1002-1 is highlighted and active. In response, management facility 102 may present page content 1004 about the current season of the media program series. As shown, for example, page content 1004 such as a cover art image for the media program series, a title of the current season of the media program series, a cost to purchase access to the current season of the media program series, a synopsis of the current season of the media program series, a number of available episodes included in the current season of the media program series, a year of release of the current season of the media program series, and a rating of the current season of the media program series may be displayed.

Figure 11:
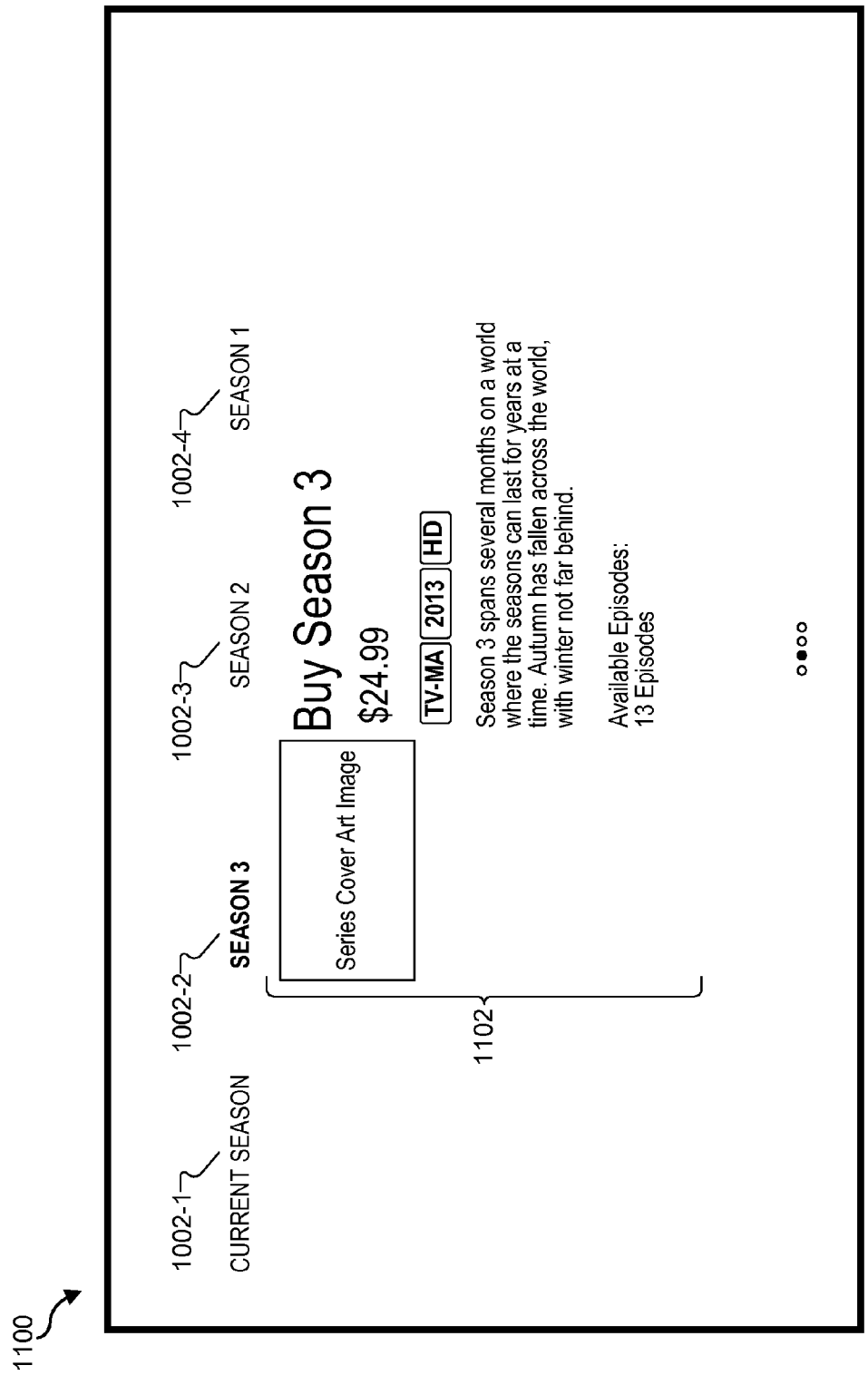

A user may provide input to navigate to and highlight column header 1002-2 in view 1000. In response, management facility 102 may present information about the immediately previous season of the media program series. For example, FIG. 11 illustrates an exemplary view 1100 of series page 406 in which column header 1002-2 is highlighted. As shown, page content 1102 such as a cover art image for the media program series, a title of the previous season of the media program series, a cost to purchase access to the previous season of the media program series, a synopsis of the previous season of the media program series, a number of available episodes included in the previous season of the media program series, a year of release of the previous season of the media program series, and a rating of the previous season of the media program series may be displayed.

Figure 12:
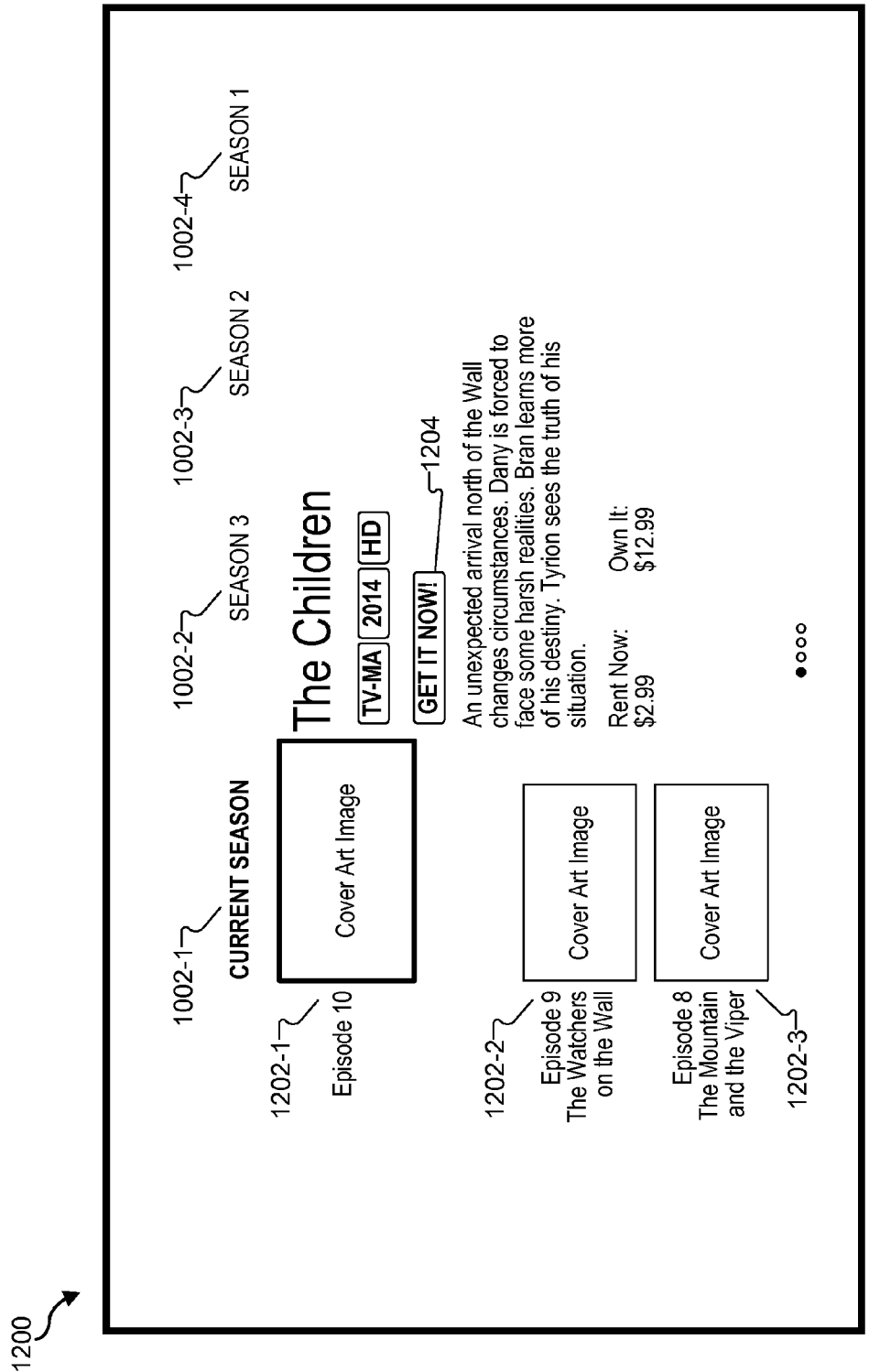

Instead of providing input to navigate to and highlight column header 1002-2 in view 1000, the user may provide input while column header 1002-1 is highlighted to cause page content for the page content column represented by column header 1002-1 to be displayed. For example, FIG. 12 illustrates an exemplary view 1200 of series page 406 in which the page content column represented by column header 1002-1 is active and a list of entries 1202 (e.g., entries 1202-1 through 1202-3) included in the page content column are displayed. As shown, the list of entries 1202 may represent episodes of the media program series that are included in the current season of the media program series. In FIG. 12, the episodes are arranged in reverse chronological order with the most recently released episode positioned at the top of the list of entries 1202.

The entries 1202 may include any content about the media programs in the current season. For example, an entry 1202 may include a cover art image for the respective episode, an episode identifier for the respective episode, a title of the respective episode, and/or any other information about the respective episode. In FIG. 12, entry 1202-1 is highlighted. In response, management facility 104 presents additional information (compared to information in other entries 1202) within view 1200 about the episode represented by entry 1202-1, including a synopsis of the episode, a cost to rent the episode, a cost to purchase the episode, and a button 1204 to be selected to initiate access to the episode.

As mentioned, as part of generating series page 406 for a media program series, management facility 104 may determine information to be included in series page 406 across multiple different media content presentation sources such that series page 406 includes page content that represents an aggregation of information from the multiple different media content presentation sources. Accordingly, a view of series page 406 may present page content that represents episodes of the media program series that have been aggregated across the multiple different presentation sources. To illustrate an example, the episodes of the current season of the media program series known as "Game of Thrones" that are represented by entries 1202 in FIG. 12 may be mapped to different presentation sources. For instance, entry 1202-1 may represent an episode accessible from a first presentation source, entry 1202-2 may represent an episode accessible from a second presentation source, and entry 1202-3 may represent an episode accessible from a third presentation source.

As an example, the episode represented by entry 1202-1 may be accessible from a scheduled media content presentation source that is scheduled to distribute the episode during an upcoming time slot, and the episode represented by entry 1202-2 may be accessible from a look-back media content presentation source that provides temporary access to the episode as described herein. As another example, the episode represented by entry 1202-1 may be accessible from a DVR presentation source, and the episode represented by entry 1202-2 may be accessible from an on-demand presentation source. These examples are illustrative only. Episodes represented in a view of series page 406 may be accessible from other combinations of presentation sources in other examples.

Figure 13:
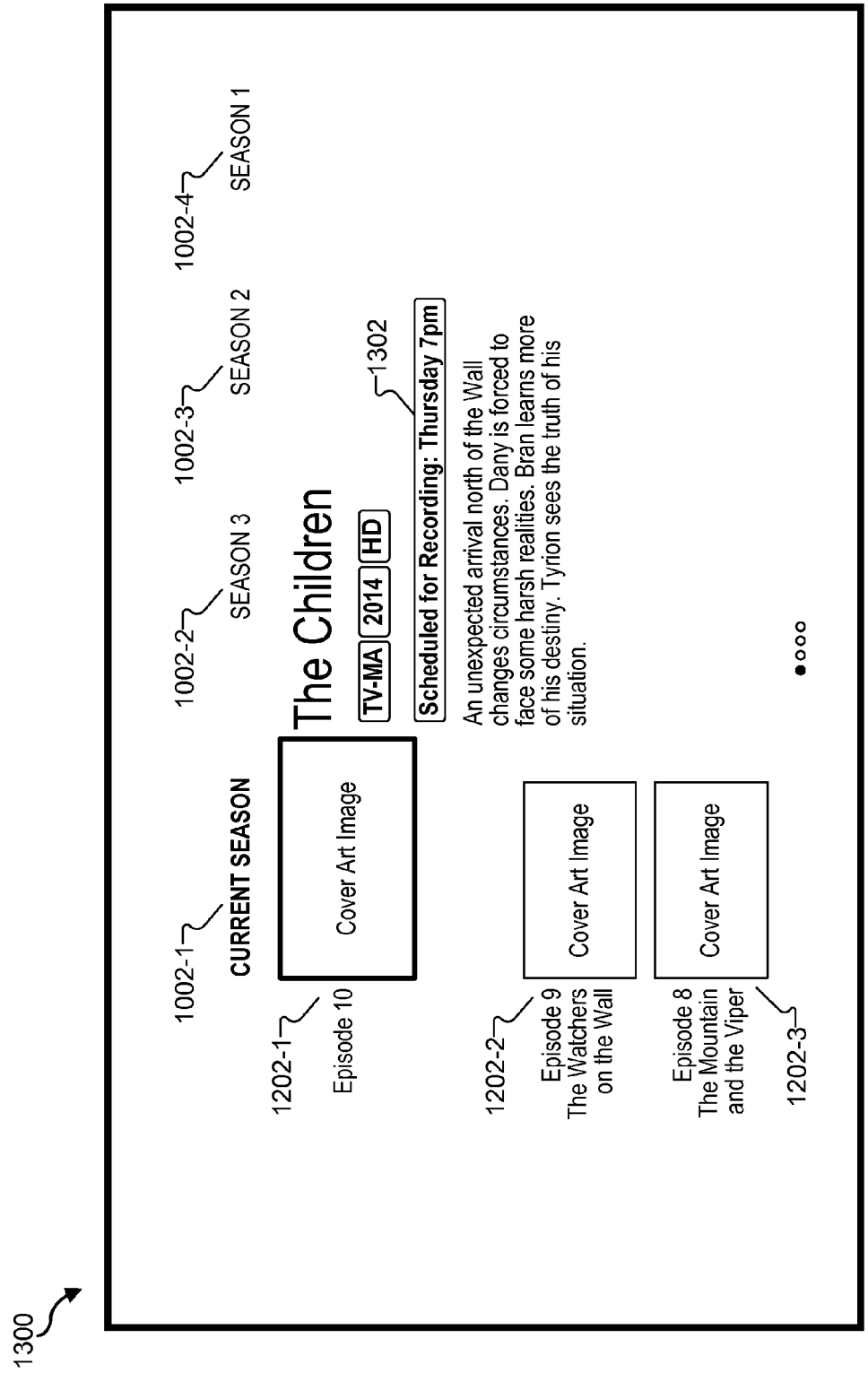

As mentioned, in certain examples, page content of a view of series view 406 may visually indicate a presentation source from which an episode of the media program series is accessible. FIG. 13 illustrates an exemplary view 1300 of series view 406 in which a presentation source badge 1302 indicates that the episode represented by entry 1202-1 is scheduled to be recorded by a DVR for access by the user of the media service. This is an indication that the episode is accessible from a scheduled media content presentation source (e.g., a broadcast television source) and/or that the episode will become accessible from a DVR presentation source. This example is illustrative only. Other badges may indicate other presentation sources of episodes in other examples.

Figure 14:
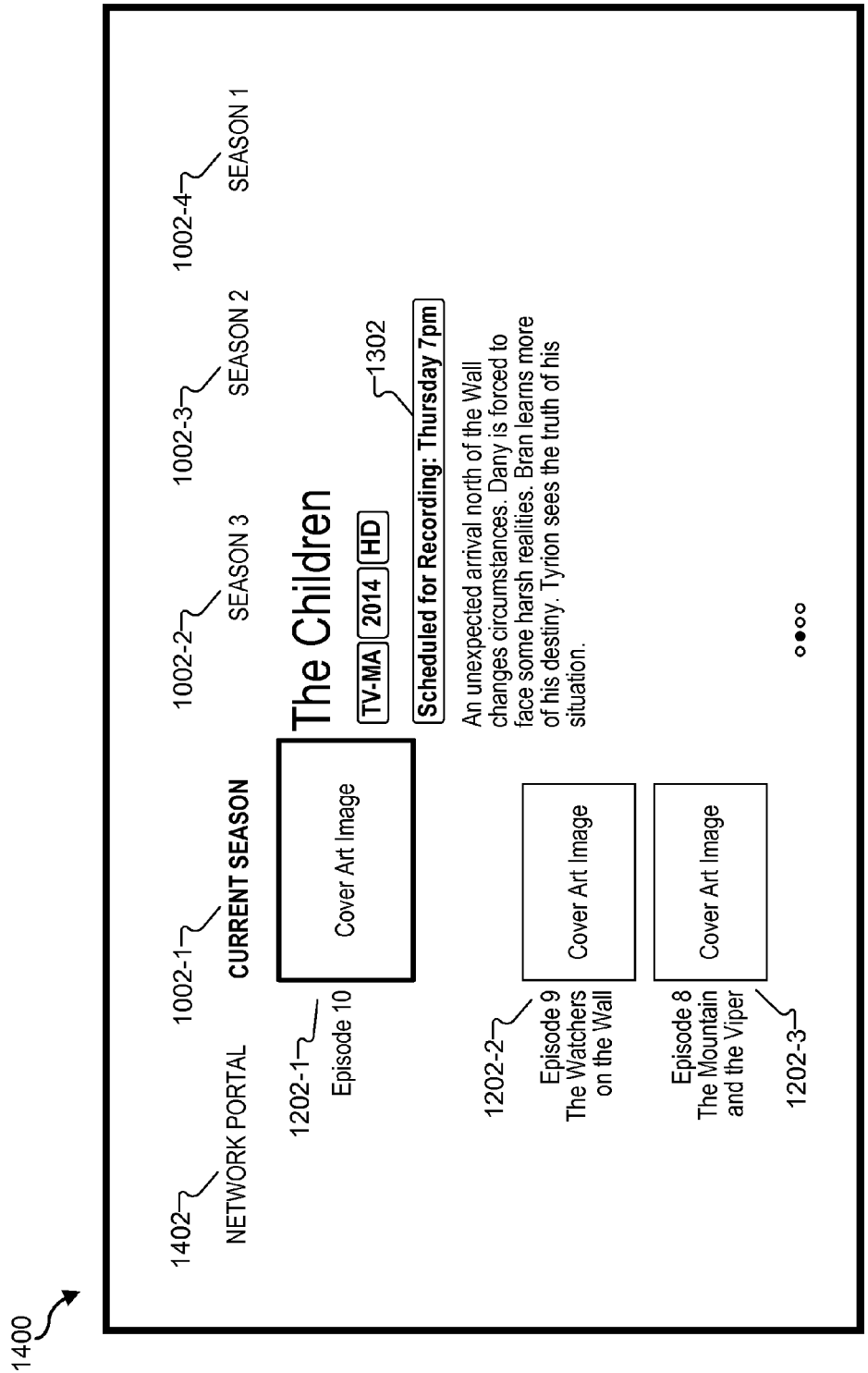

As mentioned, management facility 104 may provide a mechanism by way of which a user may navigate from a view of series page 406 to provider portal page 404. In certain examples, the mechanism may include a selectable menu option included in series page 406. To illustrate, FIG. 14 shows an exemplary view 1400 of series page 406 that includes a menu option 1402 included in-line with the row of column headers 1002. In the illustrated example, menu option 1402 is the left-most option in the row. Menu option 1402 may be navigable within the row and selectable by the user to request that a view of provider portal page 404 for the provider of the media program series be displayed. Detection facility 102 may detect a user selection of menu option 1402, and, in response, management facility 104 may provide a view of provider portal page 404, such as view 800 or view 900. Menu option 1402 is illustrative only. Any other suitable mechanisms (e.g., a dedicated remote control button, a dedicated voice command, etc.) may be used in other examples to facilitate navigation from series page 406 to provider portal page 404.

As shown in FIGS. 10-14, series page 406 may function as a bridge across all episodes and/or seasons of a media program series. Accordingly, a user may interact with views of series page 406 to discover and access episodes of the media program series across different media content presentation sources and/or seasons of the media program series.

In certain examples, a selection of an entry representing an individual media program, such as an episode of a media program series, in a view of provider portal page 404 or series page 406 may trigger a display of a view of information page 408 for the media program. For example, detection facility 102 may detect a user selection of entry 1202-1 shown in FIG. 14, and, in response, management facility 104 may provide a view of information page 408 for the episode represented by entry 1202-1 for display.

Figure 15:
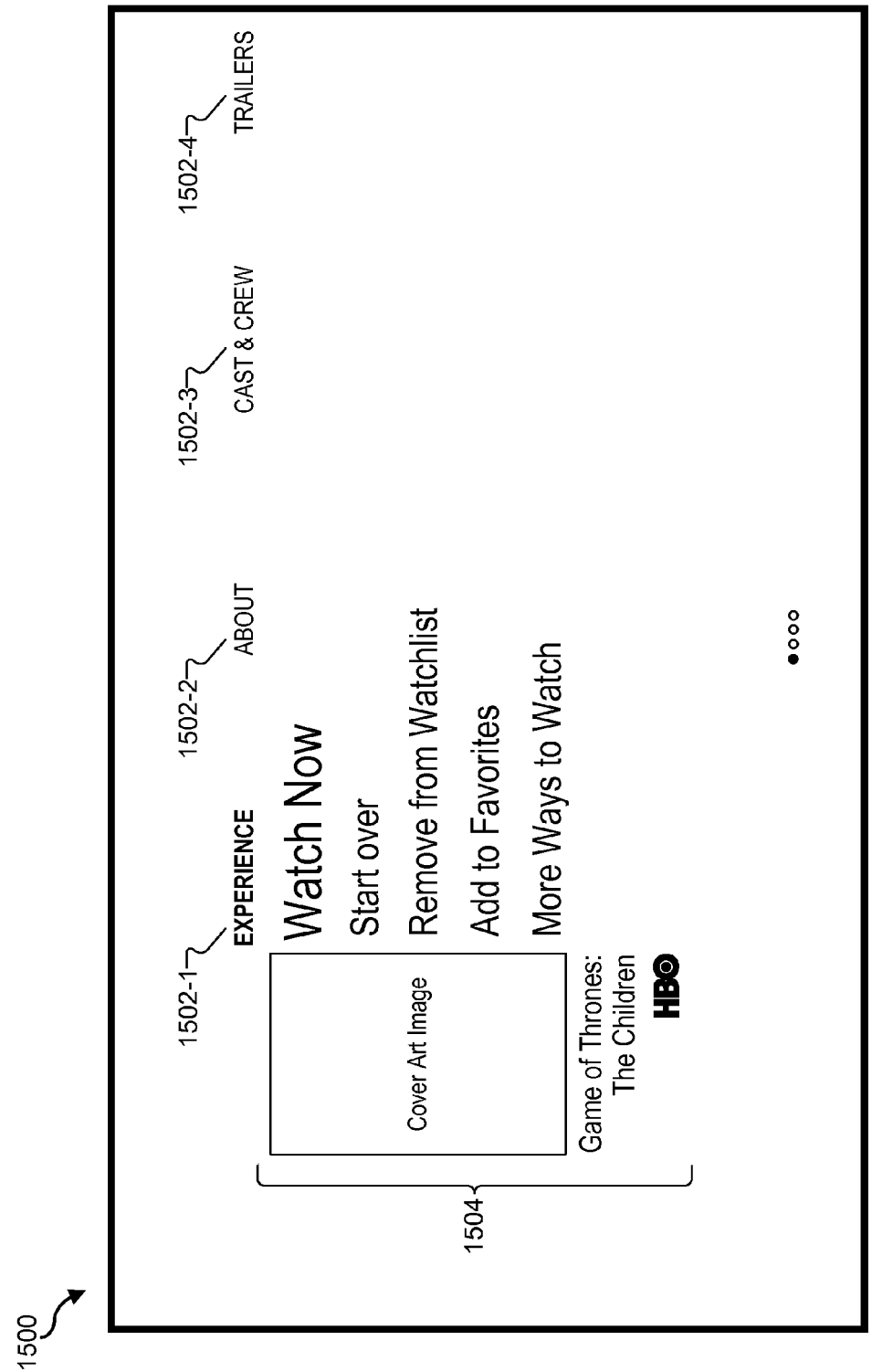

FIG. 15 illustrates an exemplary view 1500 of information page 408 that may be provided by management facility 104 for display on a display screen. As shown, view 1500 may include a row of column headers 1502 (e.g., column headers 1502-1 through 1502-4), each of which may represent a page content column. In the illustrated example, for instance, column header 1502-1 may represent a page content column that includes entries representing options for accessing and/or consuming the media program, column header 1502-2 may represent a page content column of information about the media program, column header 1502-3 may represent a page content column of information about the cast and crew of the media program, and column header 1502-4 may represent a page content column of selectable entries representing trailers for the media program.

Column headers 1502 may form a menu of navigable and selectable column header menu options that represent the respective page content columns. A vertical list of entries within a page content column may form a sub-menu of navigable and selectable sub-menu options for the column header 1502 representing the page content column.

In FIG. 15, column header 1502-1 is highlighted and active. In response, management facility 104 may present page content 1504 that includes content for the media program (e.g., a cover art image for the media program, a title of the media program, and a logo for the provider of the media program) and selectable entries representing ways to access and/or consume the media program (e.g., options to watch the media program now, to start over at the beginning of the media program, to remove the media program form a watch list, to add the media program to a list of favorites, and to access additional options for watching the media program).

One or more features of series page 406 described herein may be implemented by information page 408. As an example, column headers 1502 and entries within a page content column represented by an active column header 1502 may be navigable and selectable. As another example, management facility 104 may generate information page 408 across multiple different media content presentation sources such that information page 408 includes page content that represents an aggregation of information from the multiple different media content presentation sources. Accordingly, a view of information page 408 may present page content that represents information about the media program that has been obtained across multiple different presentation sources. To illustrate an example, a list of entries representing ways that the media program may be accessed and/or consumed may be dynamically generating by management facility 104 based on information from multiple different presentation sources. As another example, page content of a view of information page 408 may visually indicate a presentation source from which the media program is accessible.

Figure 16:
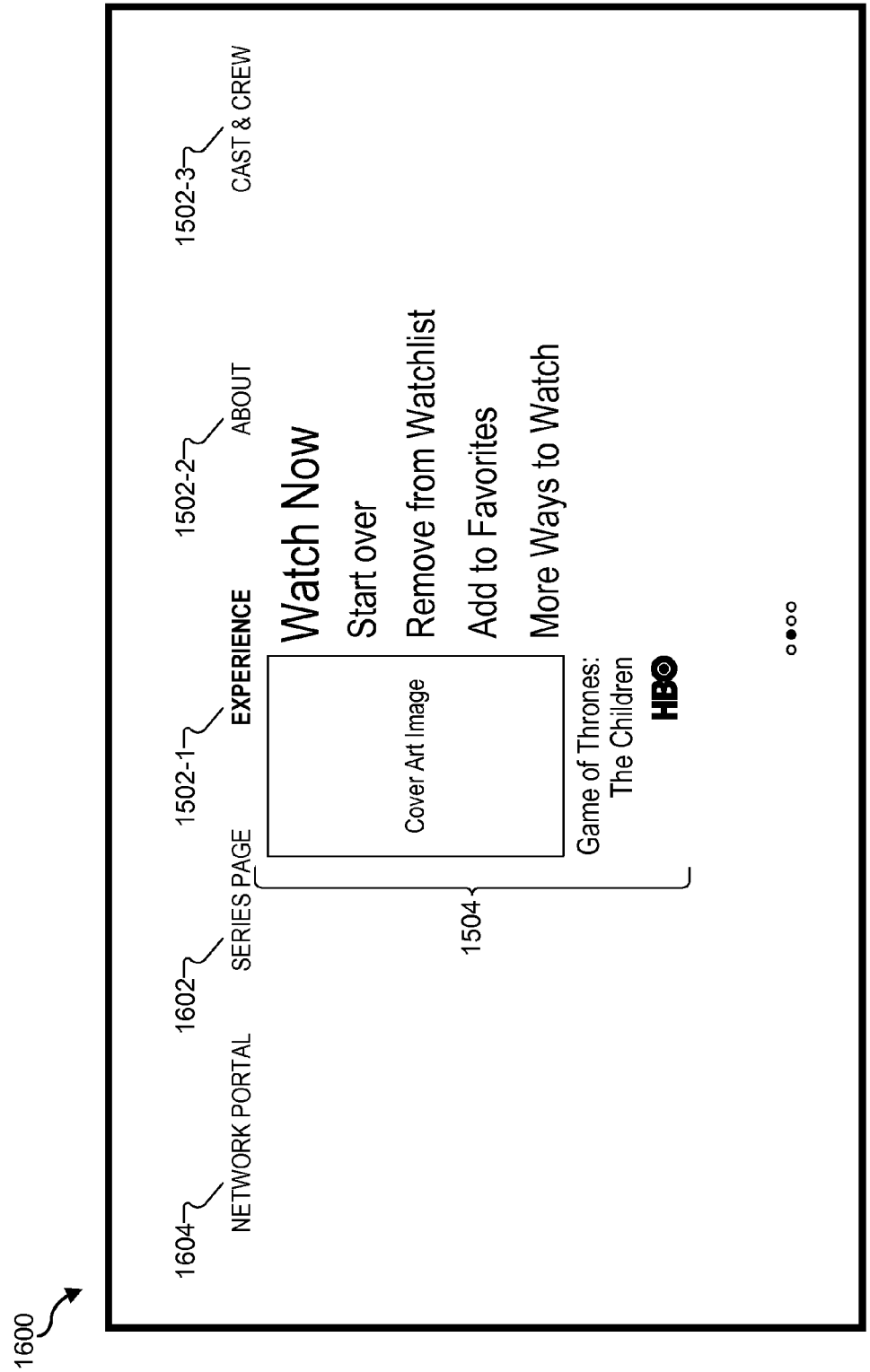

As mentioned, management facility 104 may provide a mechanism by way of which a user may navigate from a view of information page 408 to series page 406 or provider portal page 404. In certain examples, the mechanism may include one or more selectable menu options included in information page 406. Such menu options may be included in-line with the row of column headers 1502 or in any other suitable position in a view of information page 408. If the media program represented by the information page 408 is an episode of a media program series, a menu option selectable to navigate to a view of series page 406 for the media program series may be included in information page 408. In some examples, an additional menu option selectable to navigate to a view of provider portal page 404 for the provider of the media program series may be included in information page 408 together with the menu option selectable to navigate to the view of series page 406 for the media program series. To illustrate, FIG. 16 shows an exemplary view 1600 of information page 408 that includes a menu option 1602 selectable to access a view of series page 406 and a menu option 1604 selectable to access a view of provider portal page 404.

If, on the other hand, the media program represented by the information page 408 is not part of a media program series, a menu option selectable to navigate to a view of series page 406 may be omitted from information page 408. Instead, a menu option selectable to navigate to a view of provider portal page 404 for the provider of the media program may be included in information page 408. In this or a similar manner, management facility 104 may dynamically select menu options such as menu option 1602 for inclusion in information page 408 based on whether the media program represented by the information page 408 is part of a media program series.

Figure 17:
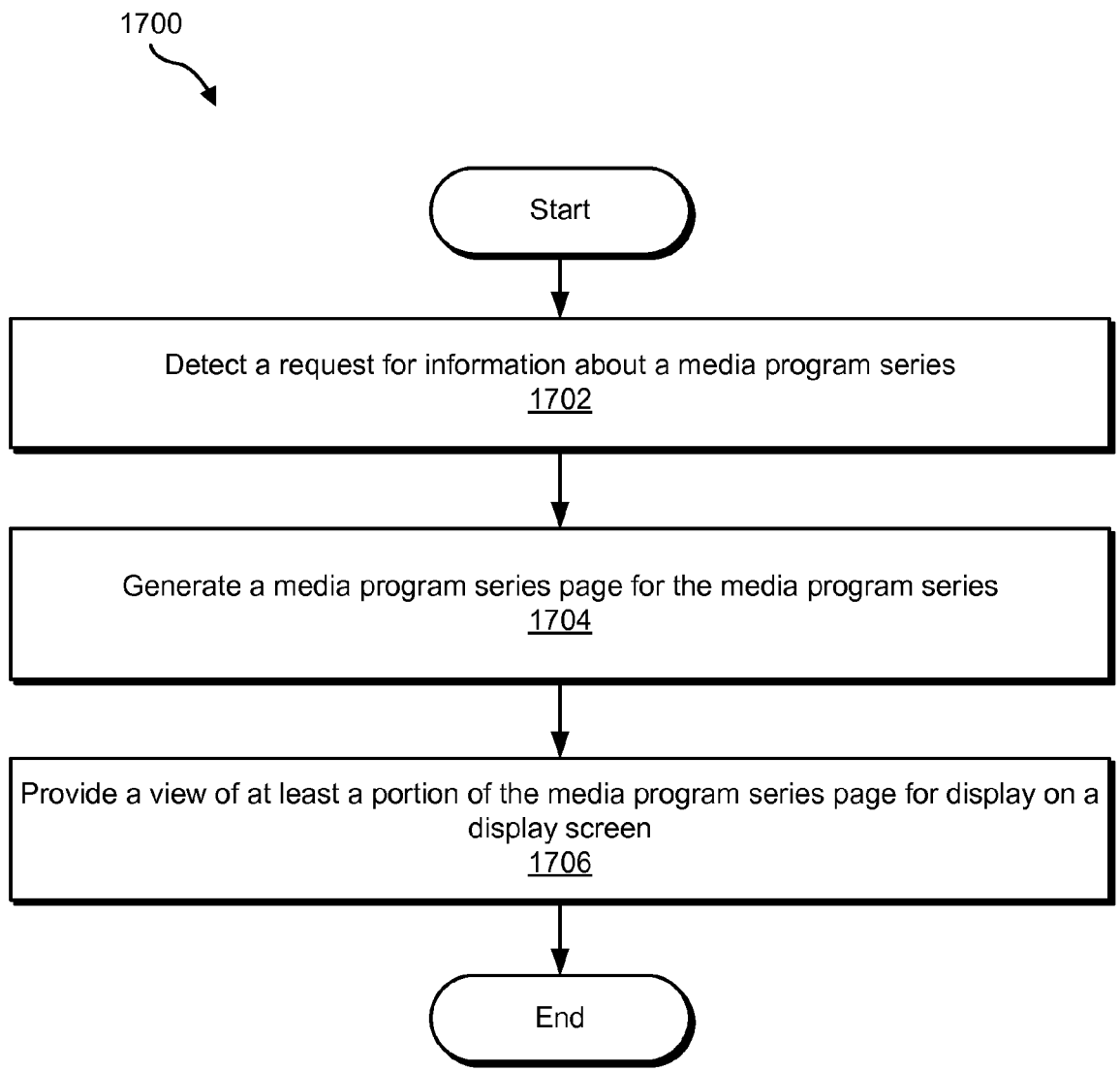
FIGS. 17-18 illustrate exemplary media service user interface methods according to principles described herein.

FIG. 17 illustrates an exemplary media service user interface method 1700. While FIG. 17 illustrates an exemplary method according to certain embodiments, other embodiments may omit, add to, reorder, combine, and/or modify any of the steps shown in FIG. 17. In certain embodiments, one or more steps shown in FIG. 17 may be performed by system 100 and/or one or more components or implementations of system 100, such as detection facility 102, management facility 104, media content access device 202, and/or media service server system 204.

In step 1702, a media service user interface system detects a request for information about a media program series. Step 1702 may be performed in any of the ways described herein. The request may be in any suitable form, such as a user selection of a user interface content associated with the media program series (e.g., a user selection of a list entry or other menu option mapped to the media program series and/or a media program series page).

In step 1704, the media service user interface system generates a media program service page for the media program series. Step 1704 may be performed as described herein. For example, step 1704 may include the media service user interface system determining, across multiple different media content presentation sources by way of which media content is accessible through a media service for presentation by a media content access device, episodes of the media program series that are available for access by the media content access device through the media service, and populating the media program series page with page content that represents the episodes of the media program series that are available for access by the media content access device through the media service.

In step 1706, the media service user interface system provides a view of at least a portion of the media program series page for display on a display screen, such as described herein. The view may include any of the exemplary views of series page 406 described herein.

Figure 18:
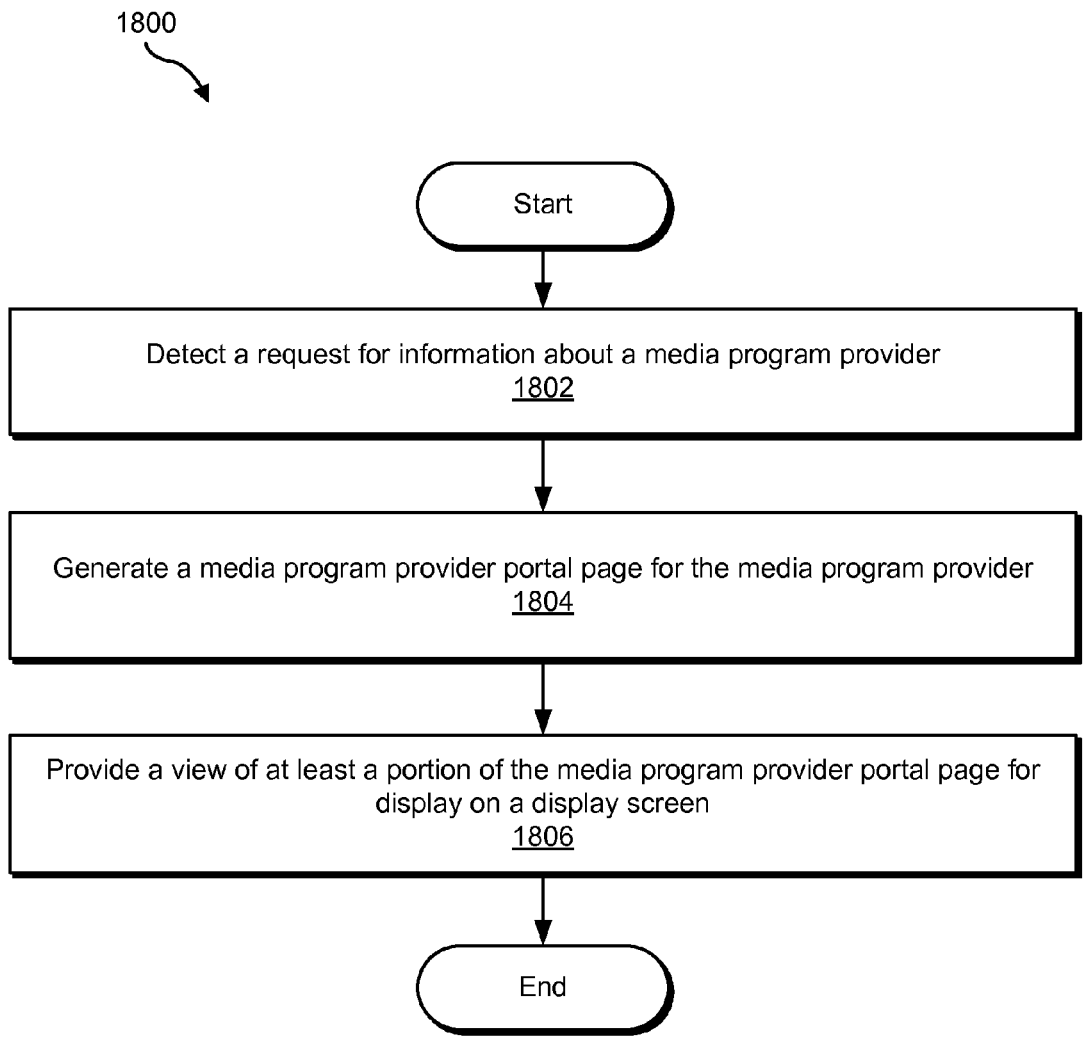

FIG. 18 illustrates another exemplary media service user interface method 1800. While FIG. 18 illustrates an exemplary method according to certain embodiments, other embodiments may omit, add to, reorder, combine, and/or modify any of the steps shown in FIG. 18. In certain embodiments, one or more steps shown in FIG. 18 may be performed by system 100 and/or one or more components or implementations of system 100, such as detection facility 102, management facility 104, media content access device 202, and/or media service server system 204.

In step 1802, a media service user interface system detects a request for information about a media program provider. Step 1802 may be performed in any of the ways described herein. The request may be in any suitable form, such as a user selection of a user interface content associated with the media program provider (e.g., a user selection of a list entry or other menu option mapped to the media program provider and/or a media program provider portal page).

In step 1804, the media service user interface system generates a media program provider portal page for the media program provider. Step 1804 may be performed as described herein. For example, step 1804 may include the media service user interface system determining, across multiple different media content presentation sources by way of which media content is accessible through a media service for presentation by a media content access device, media programs provided by the media program provider that are available for access by the media content access device through the media service, and populating the media program provider portal page with page content that represents the media programs and/or other offerings provided by the media program provider that are available for access by the media content access device through the media service.

In step 1806, the media service user interface system provides a view of at least a portion of the media program provider portal page for display on a display screen, such as described herein. The view may include any of the exemplary views of provider portal page 404 described herein.

In certain examples, methods 1700 and 1800 may be performed in conjunction with one another, such as when a user provides input to navigate between views of a media program provider portal page and a media program series page or vice versa.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM") disc, Digital Video Disc ("DVD"), any other optical medium, a random access memory ("RAM") device, a programmable read-only memory ("PROM") device, an erasable programmable read only memory ("EPROM") device, an Electrically Erasable Programmable Read-Only Memory ("EEPROM") device, a Flash EEPROM device, any other memory chip or cartridge, or any other tangible medium from which a computer can read.

Figure 19:
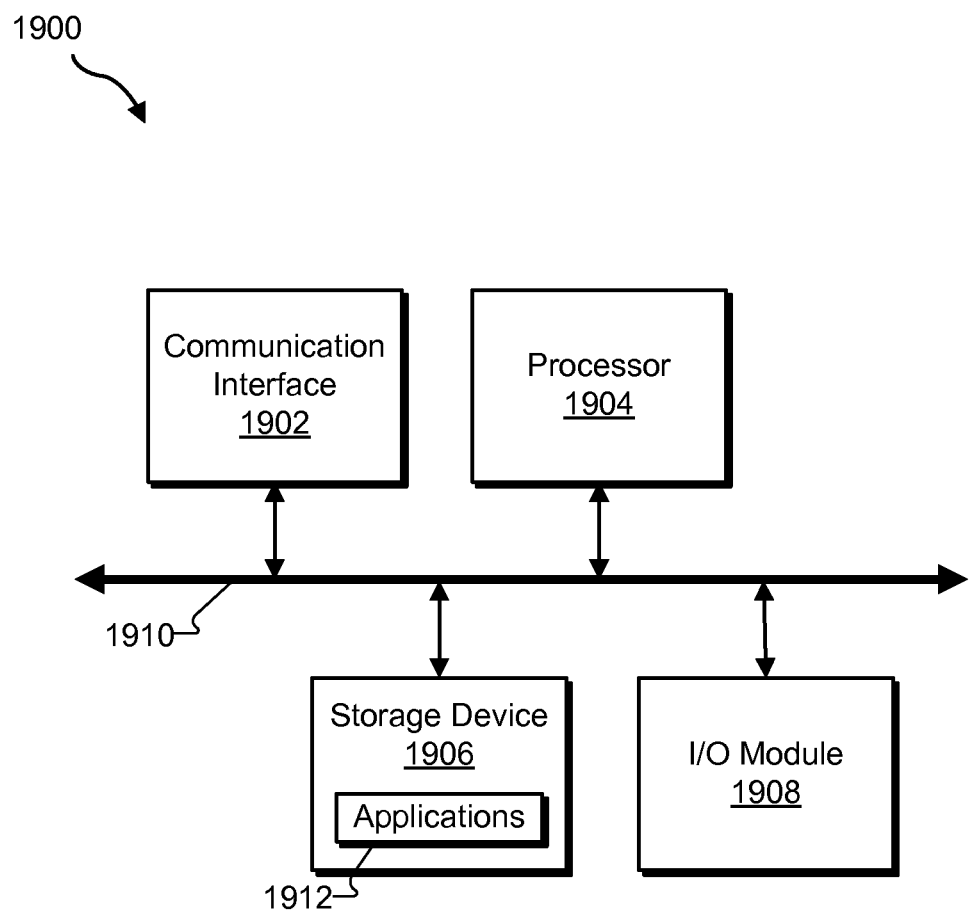
FIG. 19 illustrates an exemplary computing device according to principles described herein.

FIG. 19 illustrates an exemplary computing device 1900 that may be configured to perform one or more of the processes described herein. As shown in FIG. 19, computing device 1900 may include a communication interface 1902, a processor 1904, a storage device 1906, and an input/output ("I/O") module 1908 communicatively connected via a communication infrastructure 1910, which generally represents any form of communication structure that transfers data between components inside a computer, or between computers, and may include, but is not limited to, an internal system bus, an external expansion bus, network infrastructure, or other suitable communications structure. While an exemplary computing device 1900 is shown in FIG. 19, the components illustrated in FIG. 19 are not intended to be limiting. Additional or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, an audio/video connection, and any other suitable interface.

Processor 1904 generally represents any type or form of processing unit capable of processing data or interpreting, executing, and/or directing execution of one or more of the instructions, processes, and/or operations described herein. Processor 1904 may direct execution of operations in accordance with one or more applications 1912 or other computer-executable instructions such as may be stored in storage device 1906 or another computer-readable medium.

Storage device 1906 may include one or more data storage media, devices, or configurations and may employ any type, form, and combination of data storage media and/or device. For example, storage device 1906 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1906. For example, data representative of one or more executable applications 1912 configured to direct processor 1904 to perform any of the operations described herein may be stored within storage device 1906. In some examples, data may be arranged in one or more databases residing within storage device 1906.

I/O module 1908 may be configured to receive user input and provide user output and may include any hardware, firmware, software, or combination thereof supportive of input and output capabilities. For example, I/O module 1908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1900. For example, one or more applications 1912 residing within storage device 1906 may be configured to direct processor 1904 to perform one or more processes or functions associated with detection facility 102 and/or management facility 104. Likewise, storage facility 106 may be implemented by or within storage device 1906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
detecting, by a computer-implemented media service user interface system, a request for information about a media program series;
in response to the request:
generating, by the computer-implemented media service user interface system, a media program series page for the media program series, the media program series page dedicated to presenting content associated with the media program series, the generating comprising
determining, across multiple different media content presentation sources by way of which media content is accessible through a media service for presentation by a media content access device, episodes of the media program series that are available for access by the media content access device through the media service, and
populating the media program series page with page content that represents the episodes of the media program series that are available for access by the media content access device from the multiple different media content presentation sources through the media service; and
providing, by the computer-implemented media service user interface system, a view of at least a portion of the media program series page for display on a display screen communicatively coupled to the media content access device,
wherein the multiple different media content presentation sources comprise a first media content presentation source and a second media content presentation source,
wherein the determining of the episodes of the media program series that are available for access by the media content access device through the media service comprises
identifying that a particular episode of the media program series represented in the media program series page is available for access by the media content access device through both the first media content presentation source and the second media content presentation source, and
selecting, from the first media content presentation source and the second media content presentation source and based on a predefined media content presentation source prioritization heuristic that specifies one or more prioritization conditions for use in selecting a media content presentation source included in the multiple different media content presentation sources, only the first media content presentation source to be associated with the particular episode of the media program series in the media program series page, and
wherein the one or more prioritization conditions specified by the media content presentation source prioritization heuristic comprise one or more of a prioritization condition that specifies selecting a media content presentation source that requires using less resources than an additional media content presentation source included in the multiple different media content presentation sources, a prioritization condition that specifies selecting a media content presentation source that is financially less expensive than an additional media content presentation source included in the multiple different media content presentation sources, a prioritization condition that specifies selecting a media content presentation source based on user patterns, and a prioritization condition that specifies selecting a media content presentation source based on an amount of exposure to advertisements.

2. The method of claim 1, wherein the multiple different media content presentation sources comprise at least two of:
a scheduled media content presentation source that distributes media programs in accordance with a distribution schedule;

a look-back media content presentation source that provides temporary access to the media programs previously distributed by the scheduled media content presentation source in accordance with the distribution schedule;

a digital-video-recording media content presentation source that provides access to recordings of one or more of the media programs previously distributed by the scheduled media content presentation source in accordance with the distribution schedule; and an on-demand media content presentation source that provides on-demand access to media programs.

3. The method of claim 1, wherein:

the page content that represents the episodes of the media program series that are available for access by the media content access device through the media service comprises a first entry that represents a first episode of the media program series that is accessible by the media content access device through the first media content presentation source, and a second entry that represents a second episode of the media program series that is accessible by the media content access device through the second media content presentation source.

4. The method of claim 1, wherein the page content that represents, in the view of at least a portion of the media program series page, the episodes of the media program series that are available for access by the media content access device through the media service indicates that the particular episode of the media program series is available for access by way of the first media content presentation source.

5. The method of claim 1, wherein the view of at least a portion of the media program series page comprises a row of column header menu options representing seasons of the media program series, each column header menu option selectable to trigger a display of information about a respective season of the media program series.

6. The method of claim 5, wherein each column header menu option is mapped to a list of sub-menu entries representing episodes of the respective season of the media program series.

7. The method of claim 1, wherein the view of at least a portion of the media program series page comprises a menu option selectable to request that a view of a media program provider portal page for a provider of the media program series be displayed in place of the view of at least a portion of the media program series page.

8. The method of claim 7, further comprising:

detecting, by the computer-implemented media service user interface system, a selection of the menu option; and in response to the selection of the menu option:

generating, by the computer-implemented media service user interface system, the media program provider portal page for the provider of the media program series; and providing, by the computer-implemented media service user interface system, a view of at least a portion of the media program provider portal page for display on the display screen in place of the view of at least a portion of the media program series page.

9. The method of claim 8, wherein the request for information about the media program series is received while a view of a user interface page other than the media program provider portal page and the media program series page is displayed on the display screen.

10. The method of claim 1, embodied as computer-executable instructions on at least one non-transitory computer-readable medium.

11. A method comprising:

detecting, by a media content access device associated with an end-user account with a media service, a request for information about a media program series;

in response to the request:

generating, by the media content access device, a media program series page for the media program series, the media program series page dedicated to presenting content associated with the requested media program series, the generating comprising determining, across multiple different media content presentation sources by way of which media content is accessible through the media service for presentation by the media content access device, episodes of the media program series that are available for access by the media content access device through the media service, and populating the media program series page with page content that represents the episodes of the media program series that are available for access by the media content access device from the multiple different media content presentation sources through the media service; and providing, by the media content access device, a view of at least a portion of the media program series page for display on a display screen communicatively coupled to the media content access device, wherein the multiple different media content presentation sources comprise a first media content presentation source and a second media content presentation source, and wherein the determining of the episodes of the media program series that are available for access by the media content access device through the media service comprises identifying that a particular episode of the media program series represented in the media program series page is available for access by the media content access device through both the first media content presentation source and the second media content presentation source, and selecting, from the first media content presentation source and the second media content presentation source and based on a predefined media content presentation source prioritization heuristic that specifies one or more prioritization conditions for use in selecting a media content presentation source included in the multiple different media content presentation sources, only the first media content presentation source to be associated with the particular episode of the media program series in the media program series page, and wherein the one or more prioritization conditions specified by the media content presentation source prioritization heuristic comprise one or more of a prioritization condition that specifies selecting a media content presentation source that requires using less resources than an additional media content presentation sources included in the multiple different media content presentation sources, a prioritization condition that specifies selecting a media content presentation source that is financially less expensive than an additional media content presentation source included in the multiple different media content presentation sources, a prioritization condition that specifies selecting a media content presentation source based on user patterns, and a prioritization condition that specifies selecting a media content presentation source based on an amount of exposure to advertisements.

12. The method of claim 11, embodied as computer-executable instructions on at least one non-transitory computer-readable medium.

13. A system comprising:
at least one physical computing device that:
   detects a request for information about a media program series and in response to the request:
      generates a media program series page for the media program series, the media program series page dedicated to presenting content associated with the requested media program series, the generating comprising
         determining, across multiple different media content presentation sources by way of which media content is accessible through a media service for presentation by a media content access device, episodes of the media program series that are available for access by the media content access device through the media service, and
         populating the media program series page with page content that represents the episodes of the media program series that are available for access by the media content access device from the multiple different media content presentation sources through the media service; and
      provides a view of at least a portion of the media program series page for display on a display screen communicatively coupled to the media content access device,
   wherein the multiple different media content presentation sources comprise a first media content presentation source and a second media content presentation source,
   wherein the determining of the episodes of the media program series that are available for access by the media content access device through the media service comprises
      identifying that a particular episode of the media program series represented in the media program series page is available for access by the media content access device through both the first media content presentation source and the second media content presentation source, and
      selecting, from the first media content presentation source and the second media content presentation source and based on a predefined media content presentation source prioritization heuristic that specifies one or more prioritization conditions for use in selecting a media content presentation source included in the multiple different media content presentation sources, only the first media content presentation source to be associated with the particular episode of the media program series in the media program series page, and
   wherein the one or more prioritization conditions specified by the media content presentation source prioritization heuristic comprise one or more of a prioritization condition that specifies selecting a media content presentation source that requires using less resources than an additional media content presentation source included in the multiple different media content presentation sources, a prioritization condition that specifies selecting a media content presentation source that is financially less expensive than an additional media content presentation sources included in the multiple different media content presentation sources, a prioritization condition that specifies selecting a media content presentation source based on user patterns, and a prioritization condition that specifies selecting a media content presentation source based on an amount of exposure to advertisements.

14. The system of claim 13, wherein the multiple different media content presentation sources comprise at least two of:
   a scheduled media content presentation source that distributes media programs in accordance with a distribution schedule;
   a look-back media content presentation source that provides temporary access to the media programs previously distributed by the scheduled media content presentation source in accordance with the distribution schedule;
   a digital-video-recording media content presentation source that provides access to recordings of one or more of the media programs previously distributed by the scheduled media content presentation source in accordance with the distribution schedule; and
   an on-demand media content presentation source that provides on-demand access to media programs.

15. The system of claim 13, wherein:
the page content that represents the episodes of the media program series that are available for access by the media content access device through the media service comprises
   a first entry that represents a first episode of the media program series that is accessible by the media content access device through the first media content presentation source, and
   a second entry that represents a second episode of the media program series that is accessible by the media content access device through the second media content presentation source.

16. The system of claim 13, wherein the page content that represents, in the view of at least a portion of the media program series page, the episodes of the media program series that are available for access by the media content access device through the media service indicates that the particular episode of the media program series is available for access by way of the first media content presentation source.

17. The system of claim 13, wherein the view of at least a portion of the media program series page comprises a menu option selectable to request that a view of a media program provider portal page for a provider of the media program series be displayed in place of the view of at least a portion of the media program series page.

18. The system of claim 17, wherein the at least one physical computing device:
   detects a selection of the menu option and in response to the selection of the menu option:
      generates the media program provider portal page for the provider of the media program series; and
      provides a view of at least a portion of the media program provider portal page for display on the display screen in place of the view of at least a portion of the media program series page.

* * * * *